United States Patent [19]
Achkar et al.

[11] Patent Number: 5,562,266
[45] Date of Patent: Oct. 8, 1996

[54] RATE GYRO CALIBRATION METHOD AND APPARATUS FOR A THREE-AXIS STABILIZED SATELLITE

[75] Inventors: Issam-Maurice Achkar, Cannes la Bocca; Pierre-Yves Renaud, Mandelieu; Michel Sghedoni, Cannes; Pierre Guillermin, Nice, all of France

[73] Assignee: Aerospatiale Societe Nationale Industrielle, France

[21] Appl. No.: 230,093

[22] Filed: Apr. 20, 1994

[30] Foreign Application Priority Data

Oct. 29, 1992 [FR] France .................................. 92 12952

[51] Int. Cl.$^6$ .................................................. B64G 1/22
[52] U.S. Cl. ......................... 244/171; 73/1 D; 73/504.08
[58] Field of Search ........................ 244/158 R, 164, 244/171, 165; 73/504, 505, 517 B, 1 R, 1 D, 1 B; 364/453, 433, 455, 434, 459; 318/649, 616

[56] References Cited

U.S. PATENT DOCUMENTS

| | | | |
|---|---|---|---|
| 3,599,495 | 8/1971 | Brown | 244/171 |
| 4,393,710 | 7/1983 | Bernard | 244/171 |
| 4,437,047 | 3/1984 | Smay | 244/164 |
| 4,869,092 | 9/1989 | Bernard et al. | 244/171 |
| 5,277,385 | 1/1994 | Flamart | 244/171 |
| 5,279,483 | 1/1994 | Blancke et al. | 244/165 |
| 5,421,187 | 6/1995 | Morgan | 244/171 |

FOREIGN PATENT DOCUMENTS

| | | |
|---|---|---|
| 148550 | 4/1984 | European Pat. Off. . |
| 371344 | 11/1989 | European Pat. Off. . |
| 2522614 | 3/1982 | France . |
| 2583873 | 6/1985 | France . |
| 2637565 | 11/1988 | France . |
| 2637564 | 11/1988 | France . |
| 2622001 | 11/1988 | France . |

Primary Examiner—Galen L. Barefoot
Attorney, Agent, or Firm—Remy J. VanOphem; Thomas A. Meehan; John VanOphem

[57] ABSTRACT

Method and apparatus for calibration of a set of rate gyros on a three-axis stabilized satellite in orbit, the satellite including an attitude sensing system including the set of rate gyros, a set of actuators and control logic adapted to apply to the set of actuators control signals U derived from measurement signals M supplied by the attitude sensing system. From a time $t_0$ satellite attitude errors (E1) relative to a reference frame of reference and constant drifts (E2) of the set of rate gyros about three axes (XYZ) of the satellite are estimated conjointly. The estimated values of the attitude errors and the difference between the measured speeds ($\omega$) of the set of rate gyros and the estimated values of the constant drifts are applied in real time to the control logic and these estimated values of the constant drifts are stored when they become constant to within a first predetermined tolerance and the estimated values of the attitude errors become constant to within a second tolerance.

22 Claims, 24 Drawing Sheets

RATE GYRO CALIBRATION METHOD AND APPARATUS FOR A THREE-AXIS STABILIZED SATELLITE

BACKGROUND OF THE INVENTION

1. Field of the Invention

The invention concerns a device and a method for calibrating rate gyro drift for a satellite in equatorial or near-equatorial orbit (typically an orbit at less than approximately 10° to the plane of the equator) having at least one Sun detector, one Earth or Pole Star detector and rate gyros (of the integrating type or otherwise) and stabilized with respect to three axes by a set of thrusters.

2. Description of the Prior Art

The three axes with respect to which the attitude of a satellite is stabilized are respectively a yaw axis Z, a pitch axis Y and a roll axis X completing the direct orthonomic frame of reference. Stabilizing the attitude of the satellite entails keeping this frame of reference parallel to (or even coincident with) a theoretical (or reference) frame of reference which, in the case of a circular orbit, for example, is an axis Zr directed towards the Earth, an axis Yr perpendicular to the plane of the orbit and an axis Xr in the same direction as the orbital speed of the satellite. Other types of reference frame of reference are conventionally used to suit the type of orbit and the type of sensors with which the satellite is provided. The theoretical frame of reference Xo, Yo, Zo on which the X, Y, Z frame of reference of the satellite is to be superimposed is called the instantaneous local orbital frame of reference (it is dependent on the point in the orbit at which the satellite is located at the time).

Any telecommunication or observation satellite (these are typical satellite missions) stabilized with respect to three axes in the transfer orbit and in its final orbit has at least one solar sensor (one-axis or two-axis), one two-axis Earth sensor or one two-axis Pole Star sensor for detecting attitude errors (in roll and in pitch in the case of the Earth sensor, in roll and in yaw in the case of the Pole Star sensor, and in yaw, roll and pitch in the case of the solar sensor), and rate gyros for measuring the angular speed around each of the three axes.

Command torque for changing the attitude and/or the angular speeds of the satellite are usually generated by actuators such as momentum or reaction wheels or thrusters. This type of satellite carries at least one apogee motor (in practice a thruster) to travel to a nominal service orbit from the transfer orbit and a set of thrusters for thereafter (i.e. during the operational phase) maintaining the satellite in orbit and in an appropriate attitude.

The set of sensors and actuators associated with one or more electronic systems for processing the measured values and computing command torques constitutes what is usually referred to as the attitude and orbit control system (AOCS) of the satellite.

It is essential to be able to estimate at any time during the service life of the satellite the drift affecting the rate gyros, or at least the constant part (bias) of such drift. For a satellite carrying an Earth sensor, in particular, when the satellite is in the transfer orbit and during the orbit change phase—apogee thrust mode—the terrestrial sensor may no longer be able to see the Earth and it may be necessary to maintain the attitude of the satellite using only measurements by the other sensors, in particular the solar sensor(s) and the rate gyros (integrating or otherwise).

Likewise, during station-keeping maneuvers in the nominal orbit it is preferable to be able to measure the angular speeds of the satellite accurately in order to damp quickly any attitude disturbances caused by misalignment of the station-keeping thrusters, as such misalignments are difficult to avoid in practice.

In all these cases, attitude control stability is dependent on measurement of the angular speed by the rate gyros. In practice these measured values are often subject to a bias because of rate gyro drift, the order of magnitude of the bias being typically a few degrees per hour, and this can substantially degrade control performance.

Further, the consequences of such drift are even more important if the measured values are integrated (substituting an optical sensor for position measurements) without compensating the bias for a certain time: the result is a large error in the estimated attitude angles and consequently degraded pointing of the satellite.

For example, for a typical orbit change maneuver from the transfer orbit the satellite attitude must be maintained for approximately one hour using the rate gyros and the solar sensors. If rate gyro drift is not compensated, the resulting error in the orientation of the thrust can move the satellite to an intermediate orbit very different from that required (the error can be as much as several hundred kilometers for a drift of a few °/h).

To prevent this from happening rate gyros must in practice be calibrated at least once in the transfer orbit and possibly subsequently in the final orbit. The method and device of the present invention are concerned with this calibration.

Rate gyro calibration concepts for a three-axis stabilized satellite using solar and terrestrial sensors are known and described, for example in French patent 2,583,873 or European patent 209,429 covering a method and device for injecting a satellite into a geostationary orbit with stabilization about three axes and French patent 2,622,001 (or German patent 3,734,941 or U.S. Pat. No. 4,884,771) "Calibrating gyroscope of three-axis stabilized satellite".

In the first patent only drift of the roll and yaw rate gyros are calibrated by maintaining the yaw axis of the satellite parallel to itself. The second patent describes a similar procedure for estimating the drift of a rate gyro for any axis, the satellite being aligned with two successive reference positions.

Satellite attitude control systems using a star sensor in addition to solar and terrestrial sensors are known and described, for example, in French patent 2,522,614 covering an equatorial orbit satellite configuration with improved solar means and French patent 2,637,565 covering a three-axis active control system for a geostationary satellite. However, there is no provision in these two patents for calibration of rate gyro drift whether in the transfer orbit or on station.

The use of conventional filtering methods such as the Kalman filter is proposed in "On-Orbit Attitude Reference Alignment and Calibration", AAS paper No. 90-042, for conjointly estimating satellite attitude errors, star sensor alignment errors and scale factors, misalignments and constant drift (bias) of a three-axis rate gyro system. This document teaches storing star sensor measurements and rate gyro measurements during pointing maneuvers prescribed for the mission and processing them off-line (either on board or on the ground) in order to reconstitute the attitude of the satellite and estimate sensor misalignment and rate gyro misalignment, scale factor and drift.

SUMMARY OF THE INVENTION

An object of the invention is to calibrate rate gyro drift (at least the constant part thereof) with much greater accuracy than in the prior art solutions (i.e. better than around 0.1°/h).

It starts from the observation that all these prior art solutions for calibrating rate gyros operate off-line, without actual validation of the evaluation of the rate gyro drift (or at least of the constant bias thereof).

In order to increase the accuracy of attitude control using rate gyros, the invention proposes real time validation of the estimated rate gyro drift using the estimated drift to correct measured values obtained from the rate gyros and applied to the attitude control stages of the satellite. The invention further teaches estimation not only of the rate gyro drift but also of the actual attitude of the satellite.

To be more precise, the invention proposes a method of calibrating a set of rate gyros on a three-axis stabilized satellite in orbit and including an attitude sensing system including the set of rate gyros. A set of actuators and control logic are adapted to apply to the set of actuators control signals derived from measurement signals supplied by the attitude sensing system. According to the method of the invention, from a time $t_o$, attitude errors of the satellite relative to a reference frame of reference and constant drift of the set of rate gyros about three axes XYZ of the satellite are conjointly estimated, being characterized in that there are applied in real time to the control logic the estimated values of the attitude errors and the difference between the speed measurements $\omega$ of the set of rate gyros and the estimated values of constant drift, and these estimated constant drift values are stored when they become constant to within a predetermined first tolerance and the estimated attitude error values become constant to within a second tolerance.

The invention carries out an estimation (in practice using a Kalman filter type procedure) for reconstituting the attitude and the bias of the rate gyros in real time (on-board or on the ground) using measured values from the available solar, terrestrial and Pole Star sensors, while holding the satellite in a single reference attitude (this reference attitude is, for example, an attitude fixed in the inertial frame of reference or an Earth-pointing attitude if an Earth sensor is used).

The invention is distinguished from the previously mentioned European Patent No. 209,429, among other things, by the fact that it simultaneously estimates the attitude and the bias (whether in the transfer orbit or in the operational orbit) and applies the estimated bias and the estimated attitude in real time to the attitude control law.

According to preferred features of the invention, some of which may be combinable with others:

The first tolerance is in the order of 0.1°/h and the second tolerance is in the order of 0.5°.

The attitude errors E1 and the constant drifts E2 are estimated by means of a Kalman filter defined by the following equations, using discrete notation:

$$Xp(k+1)=F*X(k)+G*A(k)+D$$

$$X(k+1)=Xp(k+1)+K(k+1)*[Z(k+1)-H(k+1)*Xp(k+1)]$$

where:
- $k$ is a sampling index associated with time t such that $t-to=k*Ts$ where Ts is the sampling increment,
- $X(k)$ is a column vector formed of three attitude values and three drift values at time k, relative to the reference frame of reference,
- $A(k)$ is a column vector formed of three rotation increments at time k of the satellite relative to the reference frame of reference from time (k-1),
- $Z(k+1)$ is a measurement column vector formed of a plurality of n error signals each defined at time (k+1) by the difference between a measurement signal supplied by the sensing system and a set point signal,
- $Xp(k+1)$ is a six-term column vector predicted by the first equation for time (k+1),
- $X(k+1)$ is a six-term column vector estimated at time (k+1) using the second equation from $Xp(k+1)$ and $Z(k+1)$,
- $K(k+1)$ is a gain matrix with six rows and n columns,
- F and G are constant term state matrices respectively having six rows and six columns and six rows and three columns describing the respective theoretical influences of $x(k)$ and $A(k)$ on $X(k+1)$,
- D is a column vector formed of three terms describing the attitude of the reference frame of reference at time (k+1) relative to the reference frame of reference at time k and three null terms, all terms of D being null terms if the reference frame of reference remains fixed,
- $H(k+1)$ is an observation matrix with n rows and six columns of which the terms at time (k+1) are predetermined, this matrix describing the theoretical relations at any time (k+1) between $Z(k+1)$ and $X(k+1)$.

the first equation is broken down as follows:

$$E1(k+1)=E1(k)-Ts*E2(k)+A(k)+D1$$

$$E2(k+1)=E2(k)$$

where:
- $E1(k)$ and $E1(k+1)$ are formed of three attitude values of $X(k)$ and of $X(k+1)$,
- $E2(k)$ and $E2(k+1)$ are formed of three drift values of $X(k)$ and $X(k+1)$,
- D1 is formed of the first three terms of D and the matrix H is written:

$$H(k+1)=|C(k+1):0n3|$$

where:
- $0n3$ is a null matrix with n rows and three columns,
- $C(k+1)$ is a matrix with n rows and three columns such that the following theoretical equation can be written:

$$Z(k+1)=C(k+1)*E1(k+1)$$

$Z(k+1)$ is formed of at least two terms deduced from two measurements of an Earth or star sensor and at least one term deduced from a measurement by a single-axis solar sensor.

The reference frame of reference is fixed in space.

The orbit of the satellite is a transfer orbit.

The attitude sensing system is formed of at least one single-axis solar sensor and an Earth sensor and the reference frame of reference is a direct frame of reference (Xr, Yr, Zr) such that Yr is normal to the plane of the orbit, Zr points towards the Earth from the orbital position of the satellite at time $t_o$ and Xr is in the same direction as the motion of the satellite at time $t_0$.

The attitude sensing system is formed of at least one single-axis solar sensor and a star sensor pointing at the Pole Star, the orbit of the satellite is at an inclination of not more than approximately 10°, and the reference frame of reference is a direct frame of reference (Xr, Yr, Zr) such that Yr points towards the geographical South and Zr is normal to the solar direction (S) at time $t_0$.

The reference frame of reference is a frame of reference Xr, Yr, Zr such that Yr is instantaneously perpendicular to the orbital plane, Zr is instantaneously pointed towards the Earth and Xr is instantaneously in the same direction of the motion of the satellite in its orbit.

The satellite is in a circular orbit.

The attitude sensing system includes at least one single-axis solar sensor and one two-axis terrestrial sensor.

The satellite is in an orbit with an inclination of not more than approximately 10° and the attitude sensing system includes at least one single-axis solar sensor and one two-axis solar sensor adapted to point towards the Pole Star.

The invention also proposes an attitude control device of a three-axis stabilized satellite in orbit including an attitude sensing system including a set of rate gyros and a set of actuators controlled by control logic whose input is connected by a link to the output of the attitude sensing system. The invention further includes, in parallel with the link, an estimator unit adapted to receive at its input instantaneous values of the attitude of the satellite relative to a predetermined reference frame of reference and instantaneous measurements from rate gyros and to supply at its output estimated values of the attitude of the satellite and the constant drift of the rate gyros, a switching system being provided for applying to the control logic either only the outputs of the sensing system or the estimated values provided by the estimator unit.

According to other preferred features of the invention, some of which may be combinable with others:

The attitude sensing system includes at least one single-axis solar sensor and one two-axis terrestrial sensor.

The attitude sensing system includes at least one single-axis solar sensor and one two-axis star sensor adapted to be pointed towards the Pole Star.

The control logic includes a set of linear regulators and limiters, a set of filters and a set of non-linear modulators.

The linear regulators are of the proportional-derivative type.

The linear regulators are of the proportional-integral-derivative type.

The filters are second order digital filters.

The modulators are pseudo-rate modulators.

The modulators are pulse width pulse frequency (PWPF) modulators.

Objects, features and advantages of the invention will emerge from the following description given by way of non-limiting example with reference to the appended drawings.

DETAILED DESCRIPTION OF THE PREFERRED EMBODIMENT

Figure 1A:
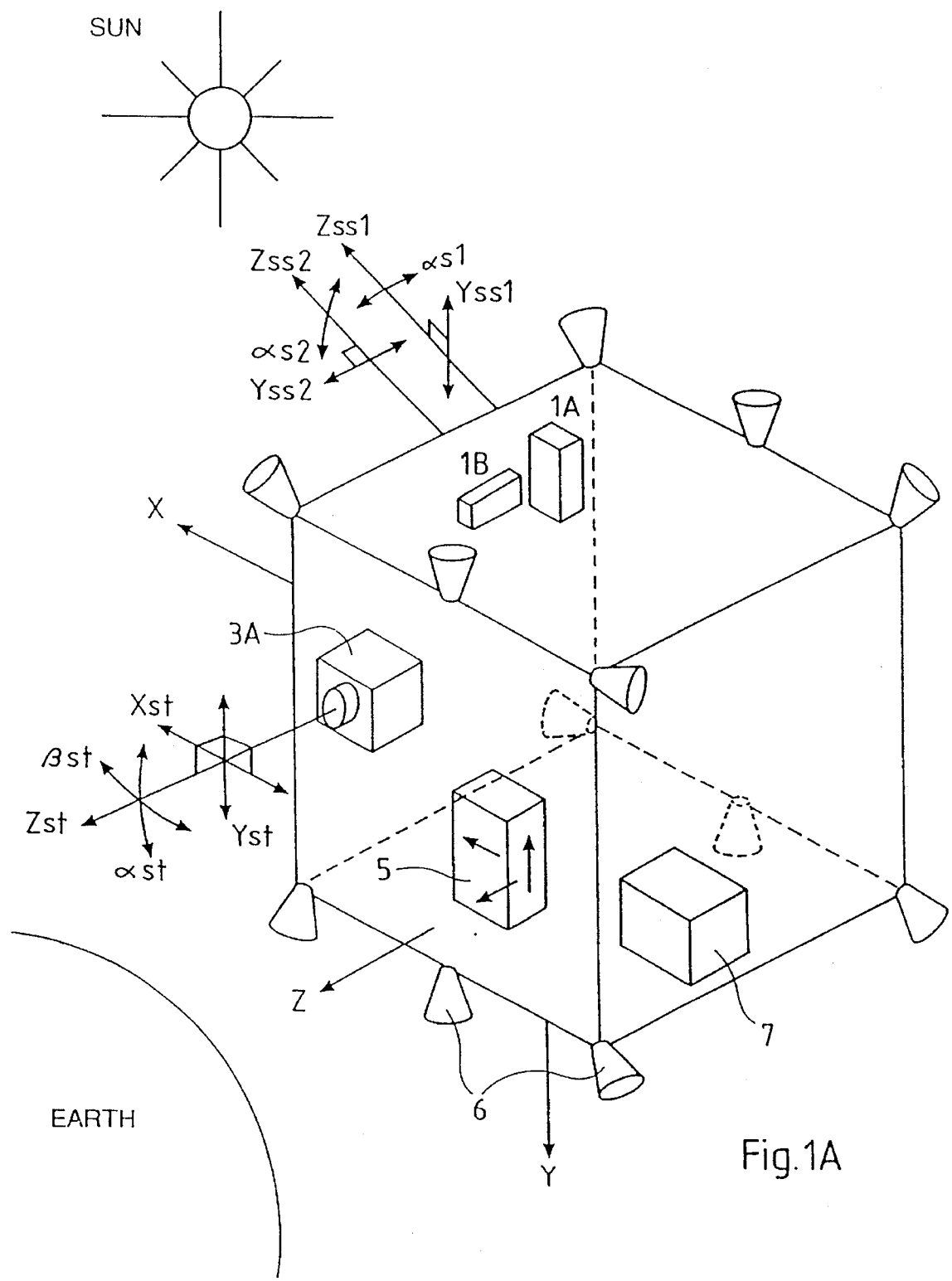
FIG. 1A is a schematic view of the attitude control and orbit correction system (ACOC) of a satellite adapted to implement the invention.
Figure 1B:
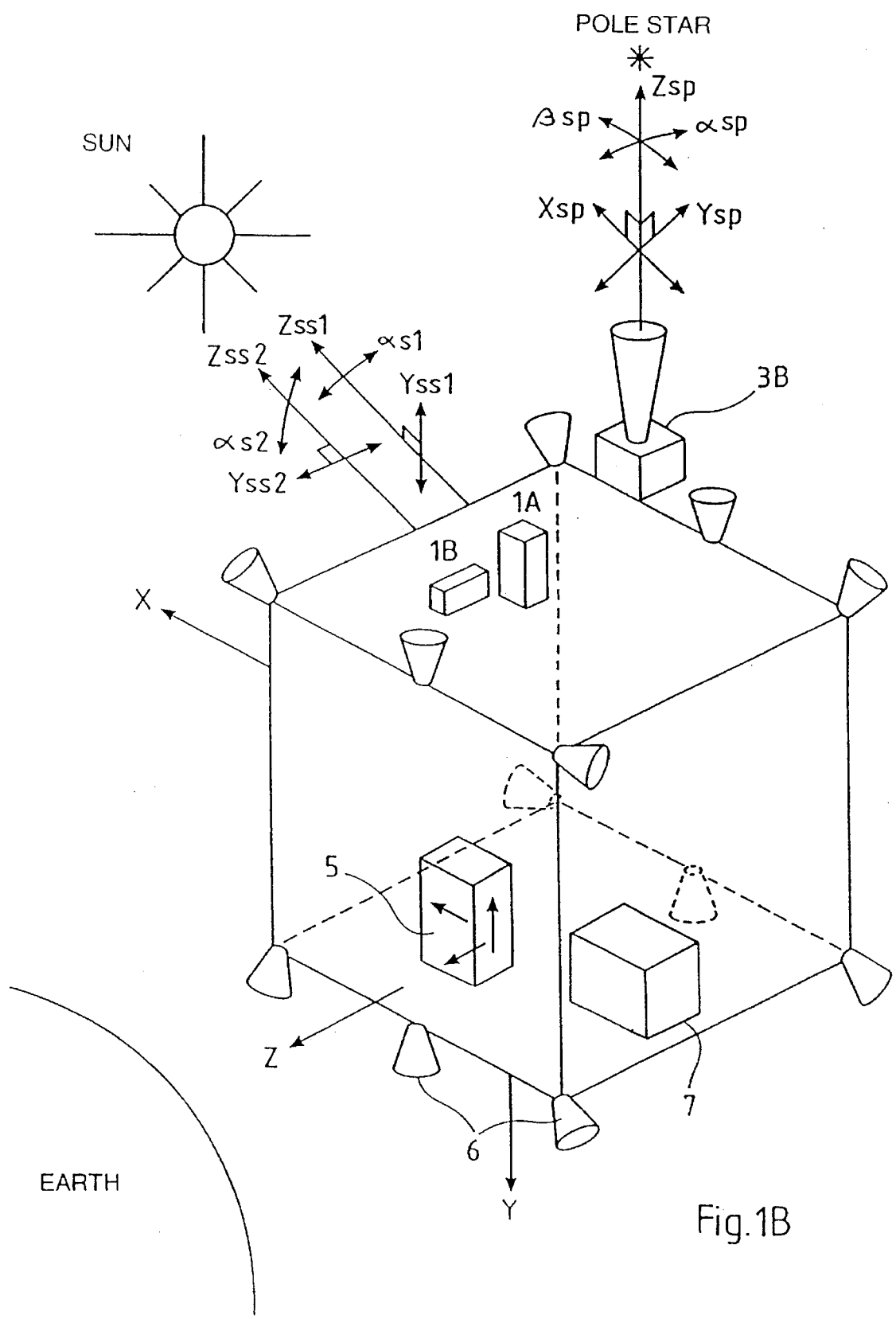
FIG. 1B is a schematic view of the attitude control and orbit correction system (ACOC) of another satellite adapted to implement the invention.

FIGS. 1A and 1B are schematic representations of a three-axis stabilized satellite defined by its frame of reference XYZ and embodying various conventional equipments (generators, antennas, etc., not shown) and typically equipped with an attitude and orbit control system which includes:

at least one single-axis solar sensor (of any appropriate known type). However, as a typical attitude control system very often includes at least one two-axis solar sensing system, the following description allows also for a two-axis configuration which gives a better estimate of rate gyro drift. FIGS. 1A and 1B include a schematic representation of a typical two-axis sensing system of this kind in the form of two single-axis solar sensors 1A and 1B (or a single two-axis solar sensor) having their optical (or measurement) axes Zss1, Zss2 parallel or near the (X, Z) plane and sufficiently wide and mutually orthogonal fields of view (typically (±60°)×(±60°)) for determining the direction of the Sun in the satellite's frame of reference XYZ, and a two-axis optical sensor which can sense either the Earth (typically an infrared horizon sensor) or the Pole Star (typically a CCD matrix sensor).

1st case: An Earth sensor 3A in FIG. 1A has its optical axis Zst parallel to or near the Z axis of the satellite (Xst and Yst denote its sensing axes) and, when the Earth is visible, measures attitude errors in roll (around the X axis) and in pitch (around the Y axis).

2nd case: A Pole Star sensor 3B in FIG. 1B has a sufficiently wide field of view—typically twice the value (orbital inclination+3°)—and is disposed so that its optical axis Zsp is parallel to or near the (−Y) axis, preferably having its sensing axes Xsp and Ysp respectively parallel to the X and Z axes of the satellite. Also, the sensitivity of this sensor is such that it can sense the Pole Star, whose visual magnitude is almost 2.3, in order to define components of its direction on the satellite axes and to deduce therefrom the roll angle (around the X axis) and the yaw angle (around the Z axis), The attitude and orbit control system also includes:

a set of rate gyros 5 for sensing the angular speed of the satellite about each of the three axes, a set of (typically 12) actuators such as thrusters 6 to generate negative or positive command torque about the three axes, and one or more analog or digital electronic systems 7 for processing the measurements effected by the sensors, computing the true anomaly of the satellite in its orbit (if necessary), estimating the attitude and rate gyro drift and generating commands to the actuators (control laws, filters, limiters and modulators).

According to the invention, during a calibration phase the attitude of the satellite and the rate gyro drift (or at least the constant part thereof, or bias) are estimated and the estimated values are used in real time to stabilize the satellite to maintain its frame of reference XYZ as closely parallel to a reference frame of reference as possible.

To be more precise:

a. in the transfer orbit (and usually after Earth acquisition) the rate gyro drift is estimated for the subsequent apogee boost mode (ABM), during which the rate gyros have an essential role to play in attitude control about the three axes. In this case, the reference frame of reference for the attitude is advantageously fixed in space; it is preferably the frame of reference XrYrZr defined by FIG. 2A in the case of an Earth sensor or by FIG. 2B in the case of a Pole Star sensor, the orientation of the satellite frame of reference XYZ relative to this reference frame of reference being defined by the roll angle $\Phi$, pitch angle $\Theta$ and yaw angle $\psi$;

b. in the operational orbit (normal mode) rate gyro drift is estimated for subsequent station-keeping requirements in which the rate gyros also have a key role in attitude control about the three axes. In this case the reference frame of reference for the attitude is preferably no longer fixed in space but the instantaneous local orbital frame of reference, the orientation of the satellite frame of reference relative to this reference frame of reference being in this case defined by the roll angle $\Phi$, pitch angle $\Theta$ and yaw angle $\psi$.

Figure 2A:
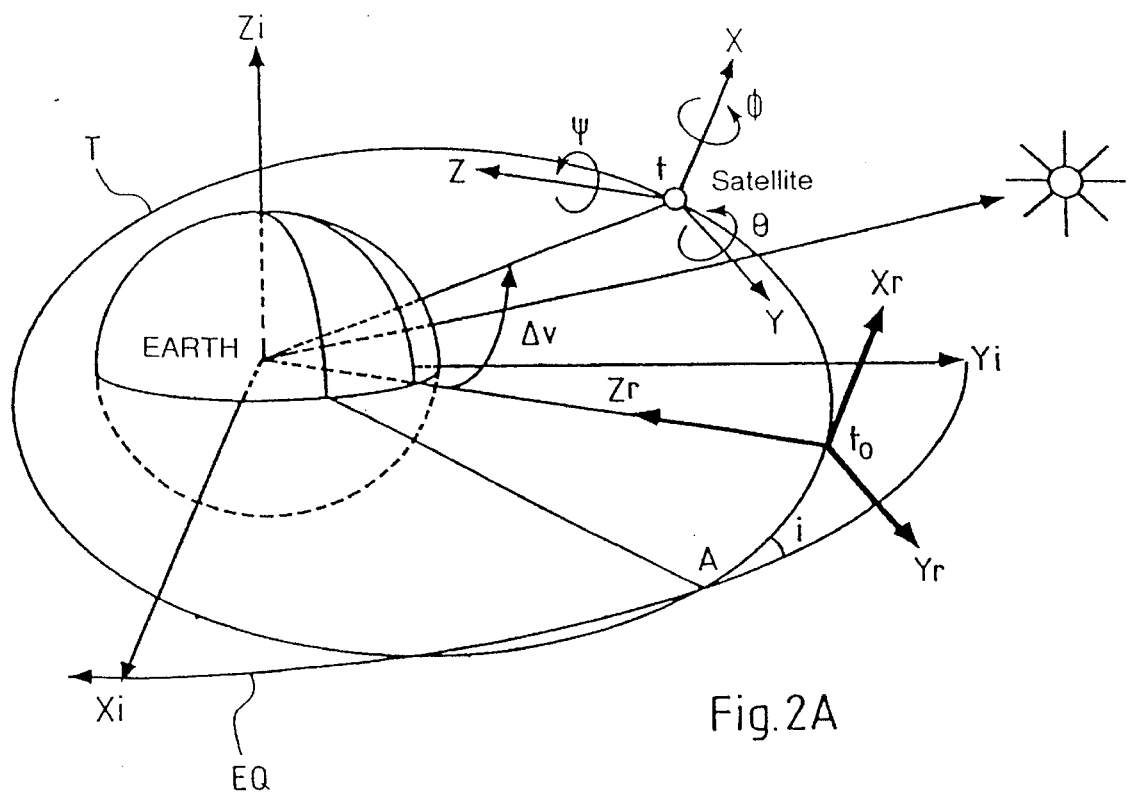
FIG. 2A is a schematic of the orbit and the frames of reference of the satellite from FIG. 1A during a calibration phase in a transfer orbit.
Figure 2B:
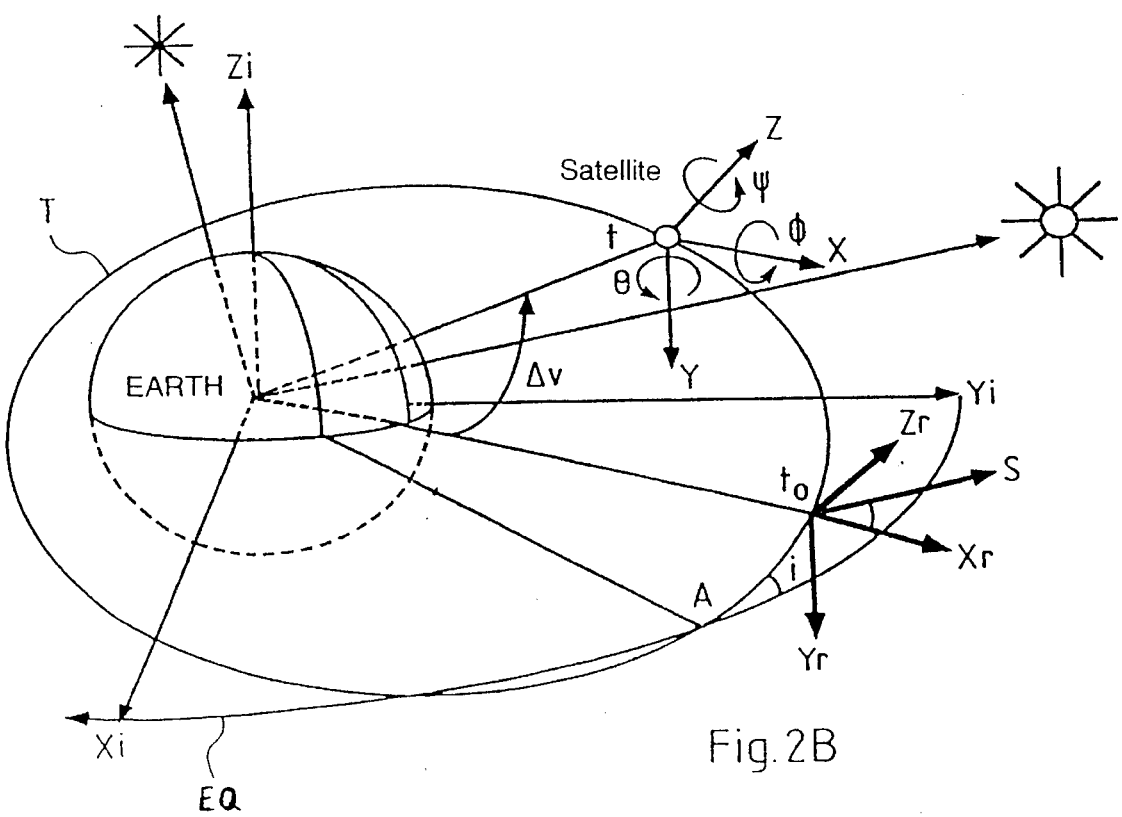
FIG. 2B is a schematic of the orbit and the frames of reference of the satellite from FIG. 1A during a calibration phase in a transfer orbit.

FIGS. 2A and 2B show in the inertial frame of reference Xi, Yi, Zi (with Xi directed towards the vernal point $\gamma$ and Zi perpendicular to the equatorial plane), the geometry of a terrestrial orbit T defined, relative to an equatorial plane EQ, by an ascending node A and an inclination i. These figures also show the true anomaly variation $\Delta v$ of the satellite between a time $t_o$ and a later time t of the calibration phase.

FIG. 2A shows, in the case of a calibration phase in transfer orbit using an Earth sensor, the satellite frame of reference XYZ at time t and a fixed reference frame of reference Xr Yr Zr which here is advantageously coincident with the local orbital frame of reference at the start time $t_0$ of the attitude estimation and rate gyro drift calibration phase, i.e. typically: Zr towards the center of the Earth, Yr normal to the orbital plane and Xr in the plane of the orbit and in the same direction as the motion of the satellite.

FIG. 2B shows in the case of a calibration phase in transfer orbit using a Pole Star sensor the satellite frame of reference X Y Z at time t and a preferably fixed reference frame of reference Xr Yr Zr defined as follows at time $t_o$: Yr towards geographical south, Xr and Zr in the terrestrial equatorial plane with Zr normal to the plane defined by the unit vector S directed towards the Sun and by the axis Yr.

For reasons of clarity, the portion of the orbit over which the satellite travels during the calibration phase is exaggerated in these figures.

Especially in the case of star sensors, the orbital inclination is preferably zero or not more than about 10°. This is not mandatory, however.

Figure 3:
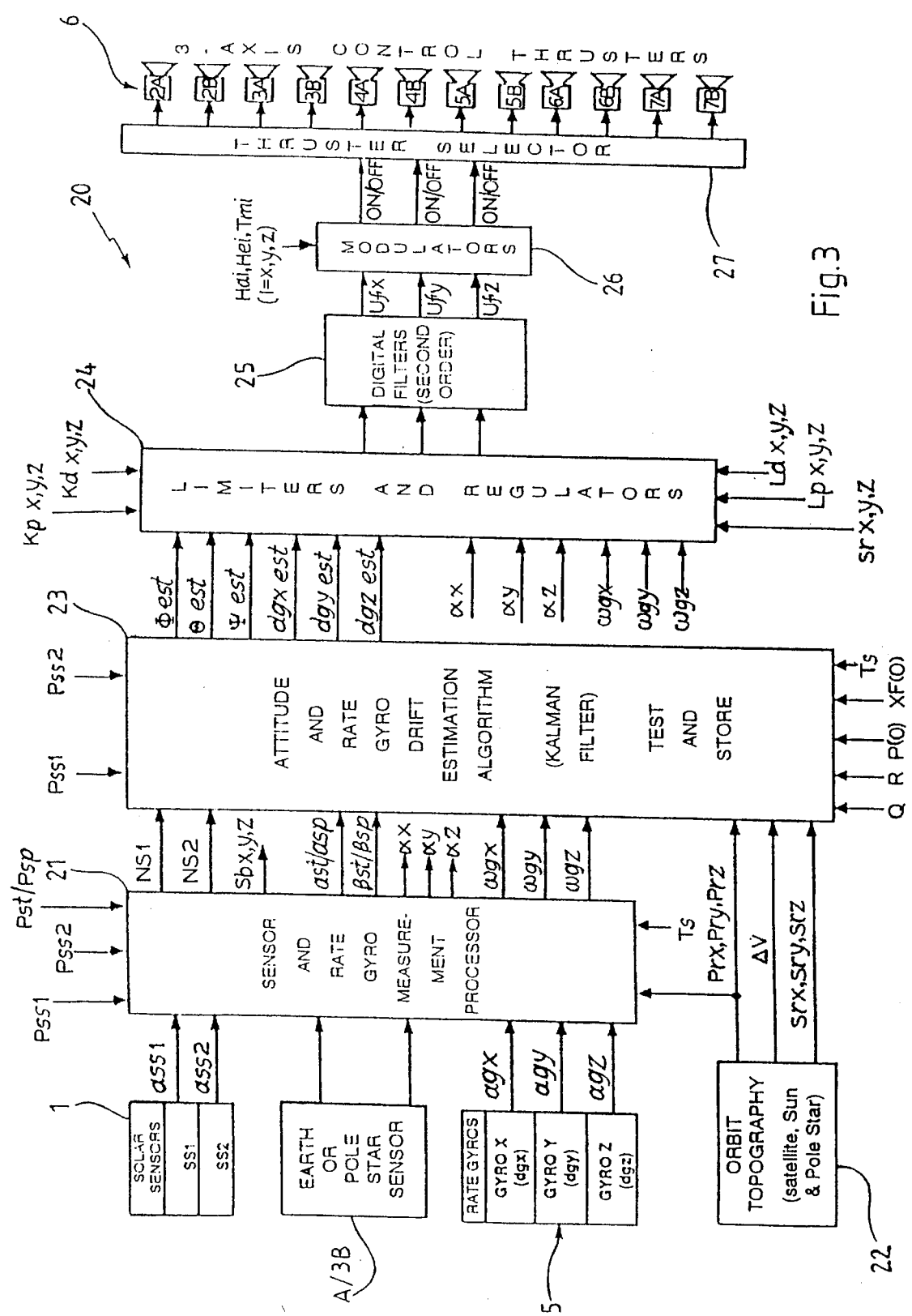
FIG. 3 is a functional schematic of the attitude control and orbit correction system.

FIG. 3 is a general functional schematic of an attitude control and orbit correction system 20 according to the invention which is valid for the satellites of FIGS. 1A and 1B.

The attitude control and orbit correction system 20 includes a logic unit 21 for processing measured values from the sensors and the rate gyros, an orbit topography unit 22, an estimator unit 23 using an algorithm to estimate the attitude and the rate gyro drift, and control logic including a set of limiters and regulators 24, a set of filters 25, a set of modulators 26 and a thruster selector unit 27 connected to the thrusters 6.

The logic unit 21 for processing measured values from the sensors 1A, 1B, 3A and 3B and the rate gyros 5 is made up of elements known in themselves; it determines the position of the Sun in the satellite frame of reference, a combination of attitude angles using the solar sensor(s), the roll and pitch angles measured by the Earth sensor, or the roll and yaw angles measured by the Pole Star sensor and the angular speeds of the satellite measured by the rate gyros. As explained below, this logic is made up of processor stages that are sometimes incorporated in the sensors (or at least in the same equipment units thereas); it is for reasons of clarity that the logic unit 21 is shown separately from the sensors here.

Solar sensor measurements:

Each single-axis sensor SS1 or SS2 (1A or 1B in FIGS. 1A and 1B) outputs an angle measurement $\alpha ss1$ or $\alpha ss2$ defined by the inclination of the Sun to the measurement axis Yss1 and Yss2. The logic unit 21 includes a stage which outputs measurements NS1 and/or NS2 representative of $\alpha ss1$ and/or $\alpha ss2$. This stage is sometimes incorporated in the sensor(s).

From these measurements and using simple trigonometrical equations familiar to one skilled in the art, the logic unit 21 calculates the components Sbx, Sby and Sbz of the unit vector directed towards the Sun along the satellite X, Y and Z axes.

As is known, and with reference to the estimator unit 23 (see FIG. 7) the measurements NS1 and NS2 can be linearized relative to the attitude angles ($\Phi$, $\Theta$, $\psi$) as follows:

$$NS1 = N10 + N1x*\Phi + N1y*\Theta + N1z*\psi$$

$$NS2 = N20 + N2x*\Phi + N2y*\Theta + N2z*\psi$$

where Ni0 is the measurement from the sensor SSi (i=1, 2) for a null attitude (i.e. the reference attitude) and (Nix, Niy, Niz) are the partial derivatives of NSi with respect to the attitude angles; this fact is exploited below; calculation of the coefficients Nij (i=1, 2 and j=0, x, y, z) is a known method, typically dependent on the following parameters:

the conversion matrices Pss1 and Pss2 defining the orientation of the sensor frames of reference (Xss1, Yss1, Zss1) and (Xss2, Yss2, Zss2) relative to the satellite frame of reference X Y Z, and the components Srx, Sry, Srz of the direction of the Sun in the reference frame of reference Xr Yr Zr.

Earth sensor measurements:

The Earth sensor outputs two signals which a known stage of the logic unit 21, sometimes incorporated into the sensor, converts to two angles βst and βst (see FIG. 1A) defining the direction of the center of the Earth with respect to the Xst, Yst and Zst axes of the sensor.

Given the usual hypothesis adopted here by way of example, whereby the reference axes of the sensor are parallel to the satellite axes (in which case pst=I3×3 unit matrix) and assuming that the attitude angles (Φ, Θ, ψ) remain sufficiently small, it is readily demonstrated that the measurements from the Earth sensor 3A can be linked to the attitude errors by the following equations (first order equations in Φ, Θ, ψ allowing for the true anomaly variation Δv if necessary):

* in transfer orbit:
  αst = Φ + Ψ * tan (Δv)
  βst = Θ + Δv
* in nominal orbit:
  αst = Φ
  βst = Θ

Pole Star sensor measurements:

When the Pole Star is visible the Pole Star sensor outputs two signals that a known stage of the logic unit 21, sometimes incorporated in the sensor, converts to two attitude angles βsp and βsp (see FIG. 1B) which can be calculated using conventional trigonometrical equations as a function of the coordinates xsp and ysp of the star in the frame of reference Xsp Ysp Zsp related to the sensor.

Assuming that the satellite attitude angles (Φ, Θ, ψ) remain sufficiently small, it can be shown that the measurements from the Pole Star sensor 3B processed by the aforementioned stage can be related to the attitude errors by the following equations (first order equations in Φ, Θ, ψ):

αsp=Φ−arc tan (Prz/Pry)

βsp=ψ−arc tan (Prx/Pry)

where Prx, Pry, Prz are the components along the reference axes Xr, Yr, Zr of the unit vector directed towards the Pole Star.

Rate gyro measurements:

The rate gyros can measure either the angular speeds (ωgx, ωgy, ωgz) of the satellite about the three axes in the case of non-integrating rate gyros or the rotation increments (αgx, αgy, αgz) in the case of integrating rate gyros. In the latter case (that considered in FIG. 3), any appropriate known type stage forming part of the logic unit 21 calculates the rate gyro speeds (ωgx, ωgy, ωgz) by differentiating the angular measurements (αgx, αgy, αgz) according to the rate gyro measurement period Tg. No processing is required if the gyrometers are of the non-integrating type, however.

Conventionally, the logic uses any appropriate known type of equation to generate attitude magnitudes αx, αy and αz intended, in attitude control mode without calibration (which is not of itself any pan of the invention), to be applied direct to the control logic (see below with reference to FIG. 4). These magnitudes are in practice calculated from coordinates αst or αsp, βsp or βst from the terrestrial or star sensor, the (measured) coordinates Sbx, Sby and Sbz of the solar vector and the coordinates Srx, Sry and Srz of the is vector Sr. These magnitudes can be calculated as follows, for example:

* Earth sensor:
  αx = αst
  αy = Srx * Sbz − Srz * Sbx
  αz = Sry * Sbx − Srx * Sby
* Pole Star sensor:
  αx = αsp − arctan (Prz/Pry)
  αy = Srx * Sbz − Srz * Sbx
  αz = Sry * Sbx − Srx * Sby The function of the orbit topography logic unit (or function) 22 is to determine, by any appropriate means:

in the case of a satellite equipped with a Pole Star sensor 3B, the instantaneous position of the satellite in its orbit and the components of the Pole Star direction in the reference frame of reference. The latter parameters can be calculated, for example, according to the orbital position of the satellite and the components of the Pole Star direction vector in the inertial frame of reference; and in the case of a satellite with an Earth sensor 3A, the position of the satellite in its orbit and, possibly, the variation of the true anomaly Δv in the satellite orbit relative to the start point of the attitude estimation and rate gyro drift calibration phase. There are various known ways to do this. For example:

using a propagation model of the orbit based on Kepler's equation, with initial conditions corresponding to the maneuver start point, or using a table of values defining at regular time intervals either the components Prx, Pry and Prz of the Pole Star direction in the reference frame of reference or the true anomaly variation Δv as a function of the time elapsed since the start of the maneuver, or using a limited development based on Kepler's equation and equations relating the true anomaly and the eccentric anomaly (see "Spacecraft Attitude Determination and Control", James Wertz, Editor, Reidel Publishing Company, Holland/USA/England, 1986). The angle Δv defines the rotation of the Z axis of the satellite around the orbital normal Yr, as shown in FIG. 2A, or under remote control from the ground.

The orbit topography function supplies the components Srx, Sry and Srz of the direction of the Sun S in the reference frame of reference Xr Yr Zr according to the date of the maneuver and the parameters of the orbit. In the case of an equatorial orbit, these components are sinusoidal functions of time.

The objective of the attitude control logic is to maintain the satellite frame of reference X Y Z parallel to the reference frame of reference Xr Yr Zr.

To this end, the attitude control logic essentially embodies (see above) a set of conventional linear regulators 24 of the proportional-derivative or proportional-integral-derivation (PID) type associated with a set of limiters, filters 25 and non-linear modulators 26 and thruster selector logic 27 for selecting thrusters to generate torque about the three axes.

The regulators 24 (see FIG. 4) determine linear control torques Ux, Uy, Uz on the basis of position gains (Kpx, Kpy, Kpz) and speed gains (Kdx, Kdy, Kdz) and, by virtue of an important feature of the invention, the following input parameters:

the attitude angles Φest, Θest and ψest and the rate gyro drifts (dgx)est, (dgy)est and (dgz)est, as estimated by the Kalman filter 23D (see below), the angular speeds ωgx, ωgy and ωgz measured by the three-axis rate gyros.

Switching means (schematically represented in FIG. 4 as switches) switch between the aforementioned attitude control mode during calibration using estimated values (the switches are then as shown in full line) and a conventional non-calibration attitude control mode of any appropriate known type using the magnitudes αx, αy, αz supplied by the logic unit 21 (the switches are then as shown in dashed line).

The linear regulators are of the proportional-derivative type in this instance, for example.

To prevent saturation the regulators are associated in a known manner with a set of limiters or zero referenced linear simple logic with preselected saturation levels in position (Lpx, Lpy, Lpz) and speed (Ldx, Ldy, Ldz).

Figure 5:
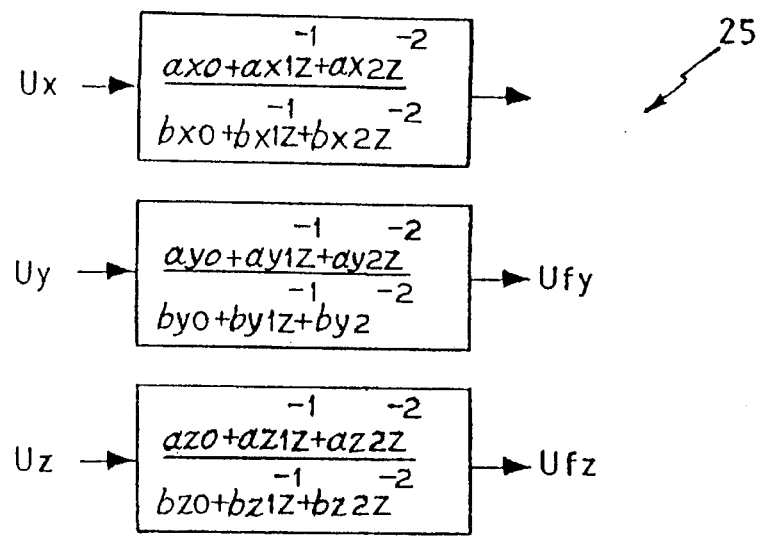
FIG. 5 is a block schematic of the filter unit 25 from FIG. 3.

The known filters 25 (see FIG. 5), which are preferably conventional digital filters (second order filters in this instance), reduce interference due to sensor noise and filter interference induced by the flexible members of the solar generator panels and the antennas (not shown in FIGS. 1A and 1B for reasons of clarity). The filters can instead be analog filters.

Using discrete notation, the input magnitudes Ui and the output magnitudes Ufi of this filter, where i=x, y or z, are conventionally related by the following equation allowing for the times n, n−1 and n−2:

$$Ufi(n)=[-bi_1*Ufi(n-1)-bi_2*Ufi(n-2)+ai0*Ui(n)+au1*Ui(n-1)+ai2*Ui(n-2)]/bi0$$

in which the parameters $bi_1$, $bi_2$ ai0 . . . bi0 are predetermined filter parameters.

Figure 6:
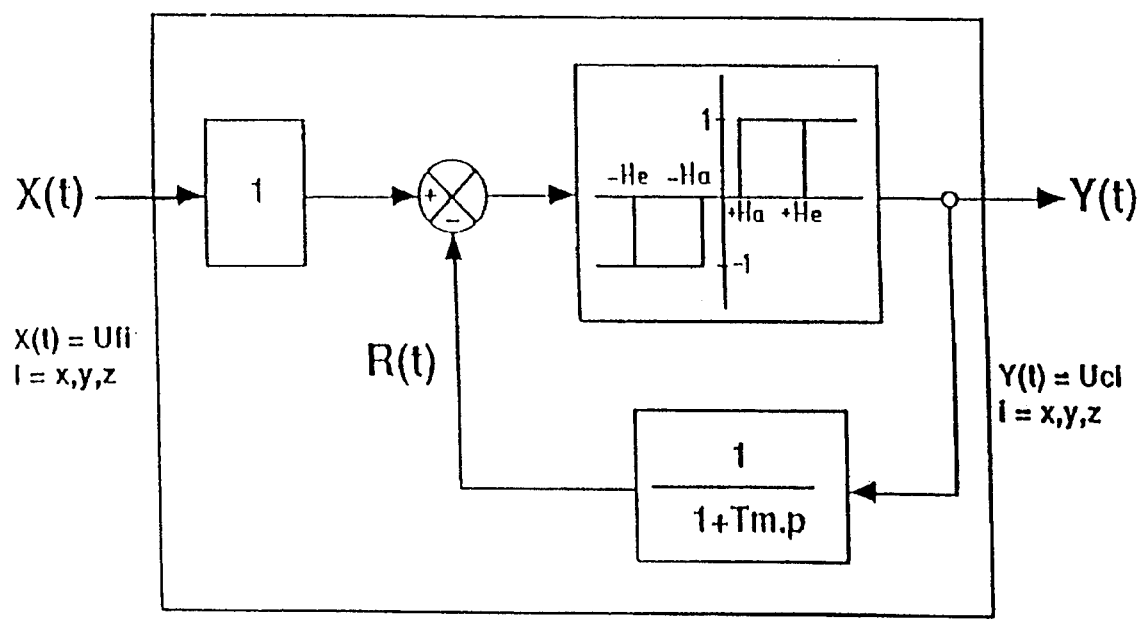
FIG. 6 is a block schematic of the modulator 26 from FIG. 3.

The modulators 26 (see FIG. 6) are of any appropriate known type, for example non-linear units generally defined by a control system structure typically embodying saturable non-linear logic with hysteresis (conventional parameters He and Ha) and a first order linear filter (time constant Tm). These modulators convert DC input levels into a series of equivalent pulses for the three-axis control thrusters, at levels of 0, +1 or −1, multiplied if necessary by a scale factor. The modulator shown here is a conventional PRM (Pseudo-Rate Modulator) with an output scale factor of unity.

Finally, the thruster selector unit 27 is hardwired or other logic of any appropriate known type for activating the thrusters, denoted 2A, 3A, 4A, 5A, 6A, 7A for branch A and 2B, 3B, 4B, 5B, 6B, 7B for branch B, for example, to produce attitude control torque about any of the three axes of the satellite.

Figure 7:
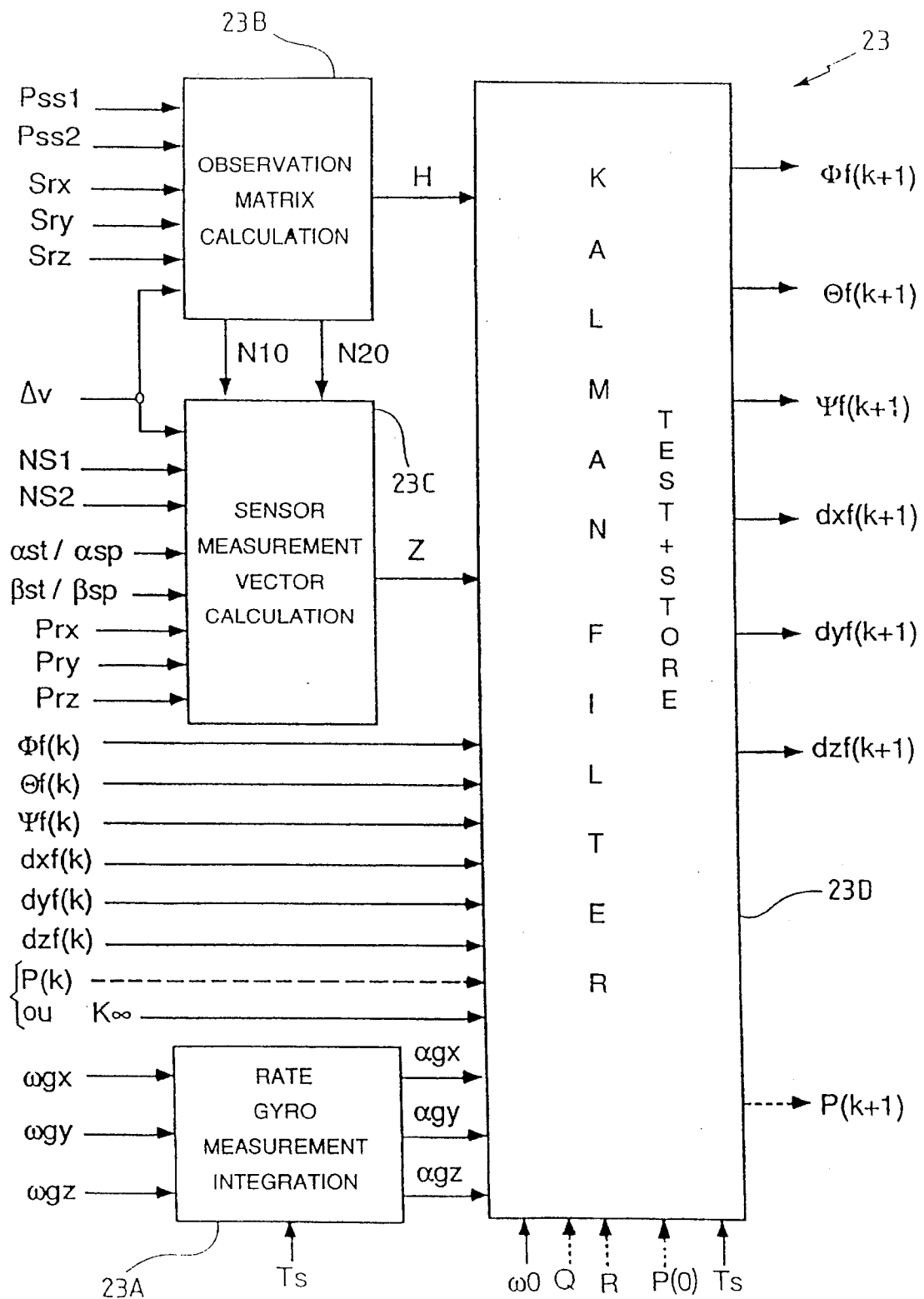
FIG. 7 is a functional diagram of the algorithm for estimating the attitude and the rate gyro drift.

The general architecture of the estimator logic 23 for estimating the attitude and the rate gyro drift is clear from the FIG. 7 functional block diagram.

Referring to this diagram, the inertial attitude of the satellite and the constant drift of its rate gyros are estimated using a Kalman filter employing, in the conventional way, an observation matrix H, a measurement vector Z and state matrices F and G. The filter is based on the three-axis attitude kinematics model (the notation is in some instances different from that used before, to allow for the fact that the filter formulation is in practice a discrete formulation). The following processing and calculating units are used for this purpose:

Rate gyro measurement integrator unit 23A (not required if integrating rate gyros are used):

→ Inputs:
. three-axis rate gyro measurements : ωgx, ωgy and ωgz
. sampling period : Ts
→ Outputs:
. rotation increment about the three axes during the sampling period : αgx, αgy and αgz

- Observation matrix H calculator unit 23B (as becomes clear below, this is a 4 × 6 or 3 × 6 matrix according to whether there are two solar measurements or only one single-axis solar measurement):
→ Inputs:
. matrices converting solar sensor frame of reference to satellite frame of reference : Pss1 and/or Pss2
. reference solar vector components : Srx, Sry, Srz
. true anomaly variation (in the case of an Earth sensor, for calibration in transfer orbit, for example) : Δv
→ Outputs:
. measurement matrix : H
. solar coefficients : N10 and/or N20 as defined above for solar measurements NS1 and/or NS2.

- Measurement vector Z calculator unit 23C for the solar and Earth or Pole Star sensors (4 × 1 vector with two solar measurements or 3 × 1 vector with only one single-axis solar measurement):
→ Inputs:
. solar sensor measurements : NS1 and/or NS2
. Earth sensor measurements : αst and βst
. or Pole Star sensor measurements : αsp and βsp
. true anomaly variation (if required for Earth sensor) : Δv
. solar coefficients : N10 and/or N20
. solar vector components in the reference frame of reference (if necessary for Pole Star sensor) : Prx, Pry, Prz
→ Outputs:
. sensor measurement vector : Z

- Kalman filter calculation unit 23D:
→ Inputs:
. observation matrix : H
. sensor measurement vector : Z
. three-axis rotation increment : αgx, αgy and αgz
. filter state vector at previous time (t = k*Ts) formed by the following six magnitudes:
  Φf(k), Θf(k), Ψf(k) → Estimated attitude angles (discrete formulation), denoted Φest, Θest and Ψest (general formulation), in FIGS. 3 and 4,
  dxf(k), dyf(k), dzf(k) → Estimated rate gryo drift (discrete formulation), denoted (dgx)est, (dgy)est and (dgz)est (general formulation) in FIGS. 3 and 4,
. value of this vector at time t = 0: XF (0),
. in the case of Kalman filter gains calculated on-line (dashed arrow in FIG. 7): covariance matrix of the estimation error at the preceding time: P(k)
→ Constant parameters:
- sampling period : Ts
- orbital angular frequency : ωo
- filter state matrices (see below):
  F (6 × 6), G (6 × 3), D (6 × 1)
. in the case of constant Kalman filter gains: gain matrix (6 × 4 or 6 × 3 for one single-axis solar measurement): K∞
. in the case of Kalman filter gains calculated on-line (dashed arrows in FIG. 7):
  * 6 × 6 covariance matrix of state noise -continued (on φf, Θf, Ψf and dxf, dyf, dzf): Q
* 4 × 4 (or 3 × 3) covariance matrix of solar, Earth or Pole Star sensor measurement errors: R
* covariance matrix of estimation at t = 0: P (0)
→ Outputs:
. filter state vector at next time (t = (k + 1)*Ts):
Φf(k + 1), Θf(k + 1), Ψf(k + 1) → Estimated attitude angles, dxf(k + 1), dyf(k + 1), dzf(k + 1) → Estimated rate gyro drift,
. in the case of Kalman filter gains calculated on-line: covariance matrix of the estimation error t = (k + 1) Ts: P(k + 1)

The typical formulation of the estimation algorithm is based on the discrete Kalman filter, as follows (see chapters 13 and 14 in the Wertz reference or chapter IX in "Le flitrage et ses applications", Labarrere, Krief, Gimonet, Cepadues Editions, ENSAE/SUP'AERO, 1978).

The Kalman filter is based on a state model of the attitude defined as follows, using discrete notation:

$$x(k+1)=F*X(k)+G*A(k)+D+W(k)$$

$$z(k)=H(k)*X(k)+V(k)$$

where:
k=sampling index, and time t=k*Ts $X(k)=[\Phi f(k), \Theta f(k), \psi f(k), dxf(k), dyf(k), dzf(k)]^t$ is the filter state vector: estimates of the three attitude angles and the rate gyro drift on the three axes, $A(k)=[\alpha gx(k), \alpha gy(k), \alpha gz(k)]^t$ is the vector of the angular rotation increments determined from the rate gyro measurements, W(k) is the discrete state noise vector corresponding to the rate gyro noise modelling error, for white noise, Gaussian noise and null average noise, V(k) is the measurement noise vector.

The measurement vector Z(k) is based on the equations mentioned above with reference to the solar and Earth or Pole Star sensors:

* Earth sensor:
  in transfer orbit
  $Z(k) = [\alpha st(k), \beta st(k) - \Delta v(k), NS1(k) - N10, NS2(k) - N20]^t$ in the case of two solar sensors or
  $Z(k) = [\alpha st(k), \beta st(k) - \Delta v(k), NS2(k) - N20]^t$ in the case of a single solar sensor, in this instance SS2;
  in nominal orbit: same equations without the anomaly term.
* Pole Star sensor:
  $Z(k) = [\alpha sp(k) + Prz/Pry, \beta sp(k) - Prx/Pry, NS1(k) - N10, NS2(k) - N20]^t$ in the case of two solar sensors or
  $Z(k) = [\alpha sp(k), + Prz/Pry, \beta sp(k) - Prx/Pry, NS1(k) - N10]^t$ in the case of a single solar sensor SS1.

The state matrices can be defined according to the meaning of the prediction equations and the vectors X(k) and A(k):

$$D = [0\ d\ 0\ 0\ 0\ 0]^t$$

$$F=\begin{vmatrix} 1 & 0 & 0 & -Ts & 0 & 0 \\ 0 & 1 & 0 & 0 & -Ts & 0 \\ 0 & 0 & 1 & 0 & 0 & -Ts \\ 0 & 0 & 0 & 1 & 0 & 0 \\ 0 & 0 & 0 & 0 & 1 & 0 \\ 0 & 0 & 0 & 0 & 0 & 1 \end{vmatrix} G = \begin{vmatrix} 1 & 0 & 0 \\ 0 & 1 & 0 \\ 0 & 0 & 1 \\ 0 & 0 & 0 \\ 0 & 0 & 0 \\ 0 & 0 & 0 \end{vmatrix}$$

where:
d=0 in transfer orbit
d=ω0*Ts in final orbit, to allow for rotation of the reference frame of reference.

More generally, this matrix D allows for any modification in space of the orientation of the reference frame of reference, regardless of the sensors used (Earth or Pole Star sensors).

The observation matrix can also be defined from various equations previously mentioned with reference to the sensors:

* with one Earth sensor:
  and two solar sensors:

$$H(k)=\begin{vmatrix} 1 & 0 & H13 & 0 & 0 & 0 \\ 0 & 1 & 0 & 0 & 0 & 0 \\ N1x & N1y & N1z & 0 & 0 & 0 \\ N2x & N2y & N2z & 0 & 0 & 0 \end{vmatrix}$$

and a single solar sensor (SS2):

$$H(k)=\begin{vmatrix} 1 & 0 & H13 & 0 & 0 & 0 \\ 0 & 1 & 0 & 0 & 0 & 0 \\ N2x & N2y & N2z & 0 & 0 & 0 \end{vmatrix}$$

where:
$H13=\tan[\Delta v(k)]$ in transfer orbit
$H13 = 0$ in final orbit

* with one Pole Star sensor:
  and two solar sensors:

$$H(k)=\begin{vmatrix} 1 & 0 & 0 & 0 & 0 & 0 \\ 0 & 0 & 1 & 0 & 0 & 0 \\ N1x & N1y & N1z & 0 & 0 & 0 \\ N2x & N2y & N2z & 0 & 0 & 0 \end{vmatrix}$$

and a single solar sensor (SS1):

$$H(k)=\begin{vmatrix} 1 & 0 & 0 & 0 & 0 & 0 \\ 0 & 0 & 1 & 0 & 0 & 0 \\ N1x & N1y & N1z & 0 & 0 & 0 \end{vmatrix}$$

The algorithm of the Kalman filter (dynamic estimation equations) is used to carry out an optimal recursive estimation of the state X(k+1) at time t=[(k+1)*Ts] from the preceding state X(k), and to propagate the estimation error covariance matrix P(k) in the case of Kalman filter gains calculated on-line, and thus to calculate in real time the estimated attitude angles and rate gyro drift.

To be more precise, the filter equations correspond to two successive stages:

a) Stage 1—Prediction:

$$Xp(k+1)=F*X(k)+G*A(k)+D \quad (1)$$

and, in the case of Kalman filter gains calculated on-line:

$$Pp(k+1)=F*P(k)*F^t+Q \quad (2)$$

$$K(k+1)=Pp(k+1)*H(k+1)^{t}*[H(k+1)*Pp(k+1)*H(k+1)^t+R]^{-1} \quad (3)$$

b) Stage 2—Correction:

$$X(k+1)=Xp(k+1)+K(k+1)*[Z(k+1)-H(k+1)*Xp(k+1)] \quad (4)$$

in the general case, or:

$$P(k+1)=Pp(k+1)-K(k+1)*H(k+1)*Pp(k+1)^t \quad (5)$$

in the case of Kalman filter gains calculated on-line, where:

Q is the state noise covariance matrix W(k),

R is the measurement noise covariance matrix V(k),

P(k) is the estimation error covariance matrix at time t(k), (P(0) given),

K(k) is the estimation gain matrix at time t*Ts (constant or calculated on-line), Xp(k) is the prediction state vector (X(0) given), Pp(k) is the prediction error covariance matrix.

As the prediction and correction equations show, the estimation dynamics and performance are strongly dependent on the gain matrix K(k). In the nominal case this is calculated by solving a Riccatti type matrix equation with 6×6 matrices obtained by combining equations (3) and (5) above.

If the memory capacity of the processor is limited, however, or if there is a requirement to save processing time (for example to execute other tasks having a higher priority), it is possible—after solving the matrix equations (3) and (5)—to use a single value (asymptotic gain) or N values (tabulated variable gains) of the matrix K, denoted K∞, held in memory or transmitted to the satellite from the ground.

FIGS. 8A through 8D and 9A through 9D expand on FIG. 7, in application of what is stated above, according to whether the estimate is done in the transfer orbit or in the operational orbit, with one or two solar sensors, and with one Earth of Pole Star sensor, I33 being the identified 3×3 matrix and 033 being the 3×3 matrix in which all the terms are null.

Figure 8A:
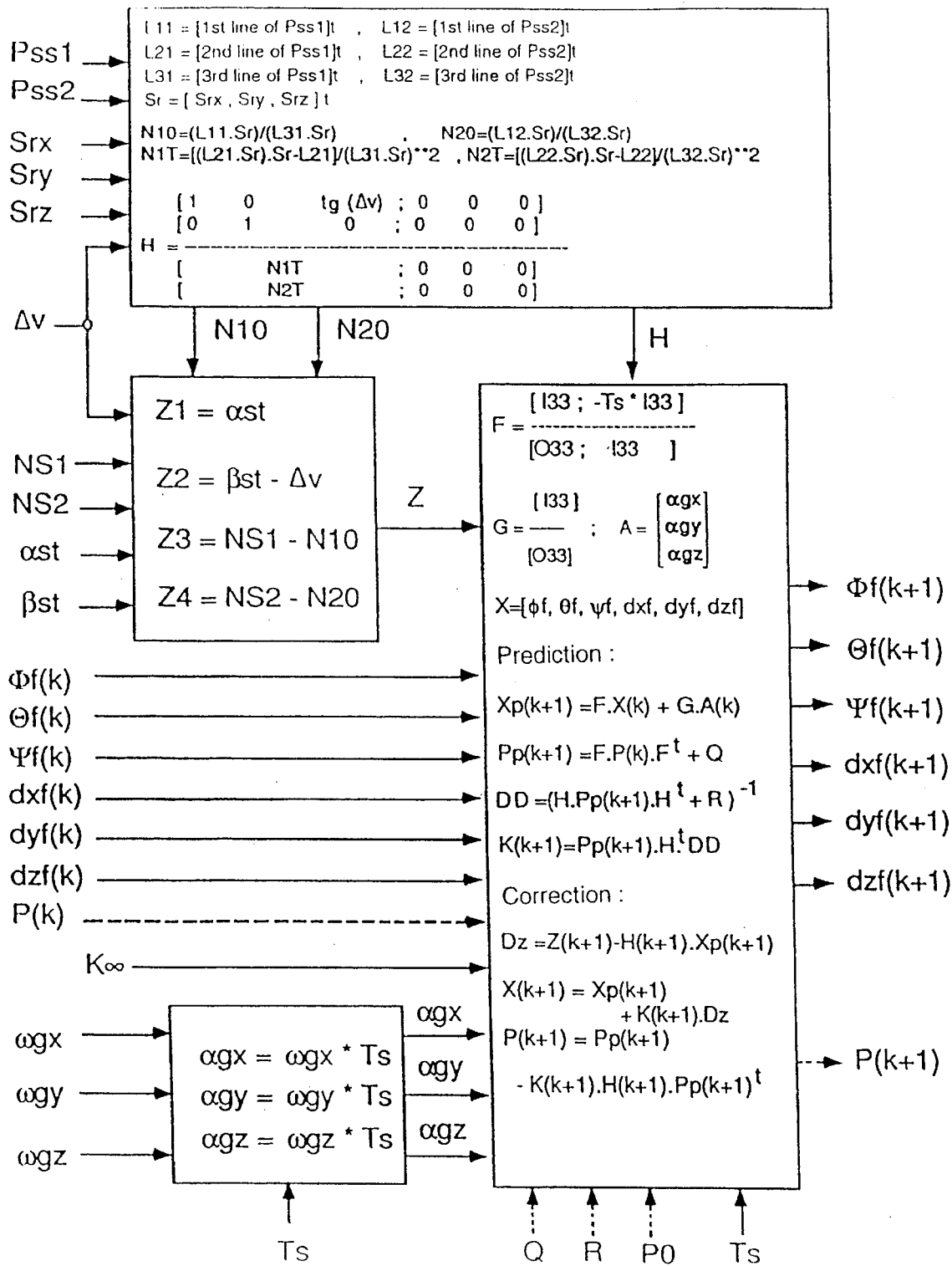
FIGS. 8A through 8D are expanded diagrams of this algorithm for the satellite in a transfer orbit, with one or two solar sensors and with one Earth or Pole Star sensor, respectively.

FIG. 8A shows, for example, the detailed structure of the algorithm for estimating attitude and rate gyro drift in transfer orbit using two single-axis solar sensors and one two-axis Earth sensor.

Figure 8B:
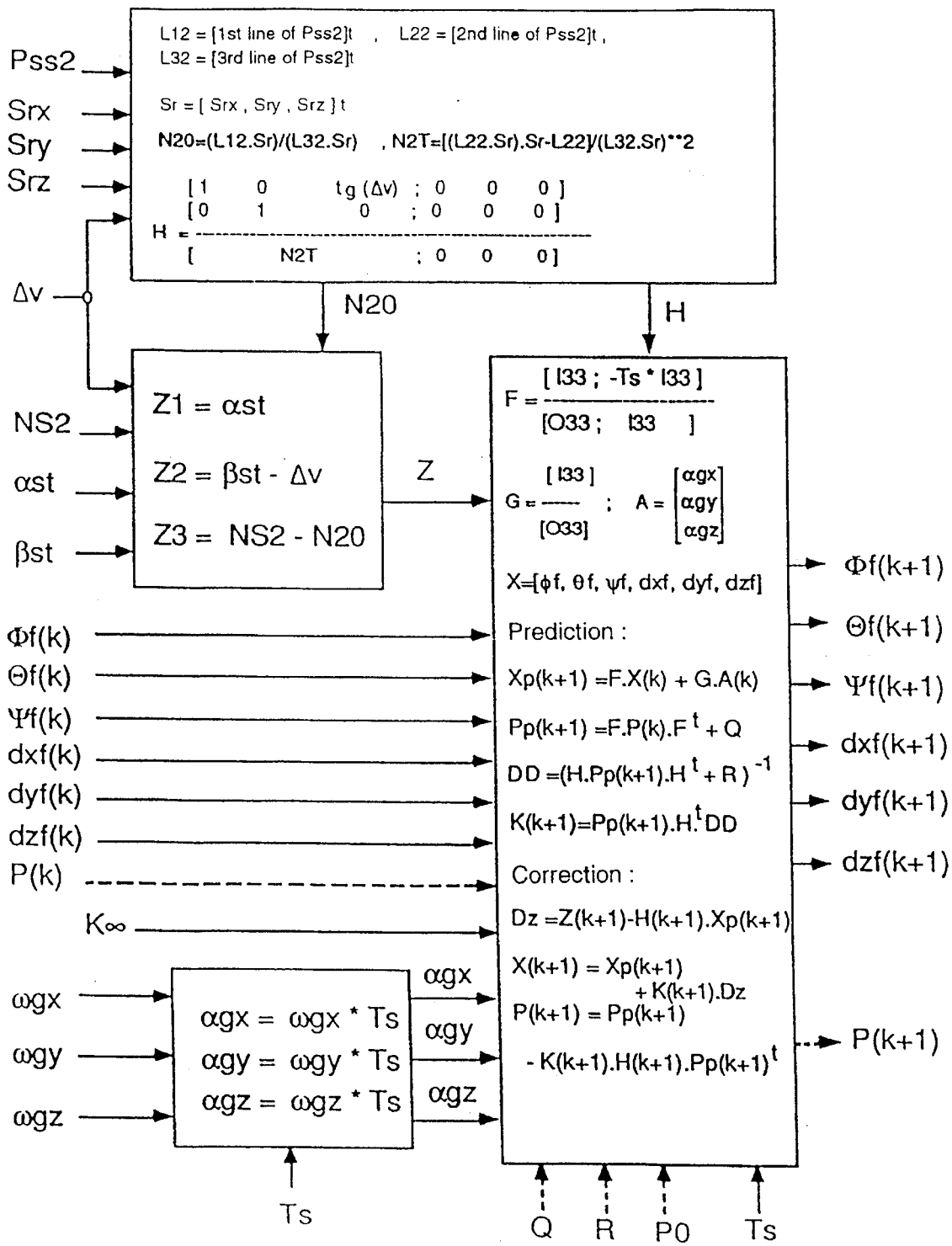

FIG. 8B shows, for example, the detailed structure of the algorithm for estimating attitude and rate gyro drift in transfer orbit using one single-axis solar sensor (SS2) and one Earth sensor.

Figure 8C:
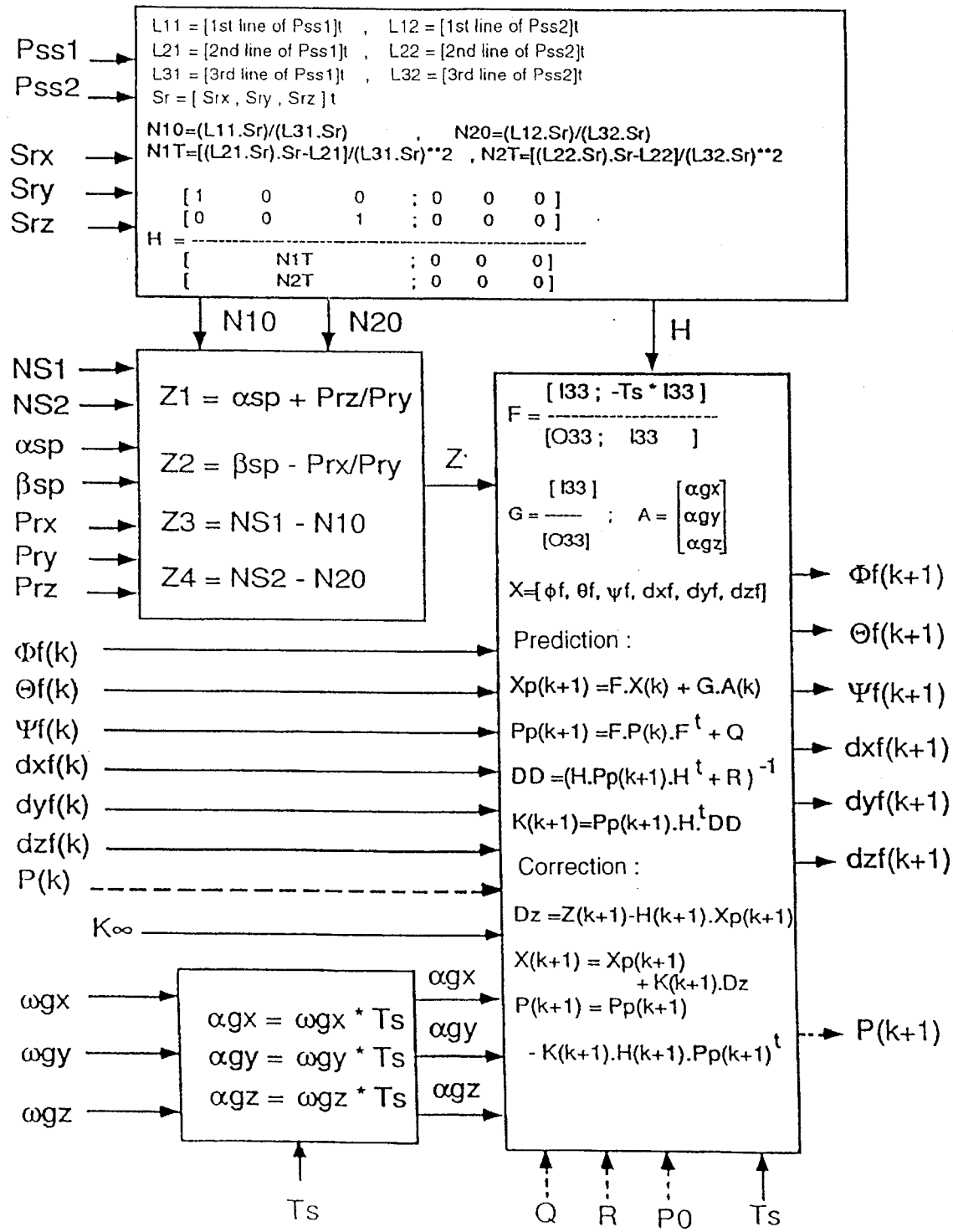

FIG. 8C shows, for example, the detailed structure of the algorithm for estimating attitude and rate gryo drift in transfer orbit using two single-axis solar sensors and one two-axis Pole Star sensor.

Figure 8D:
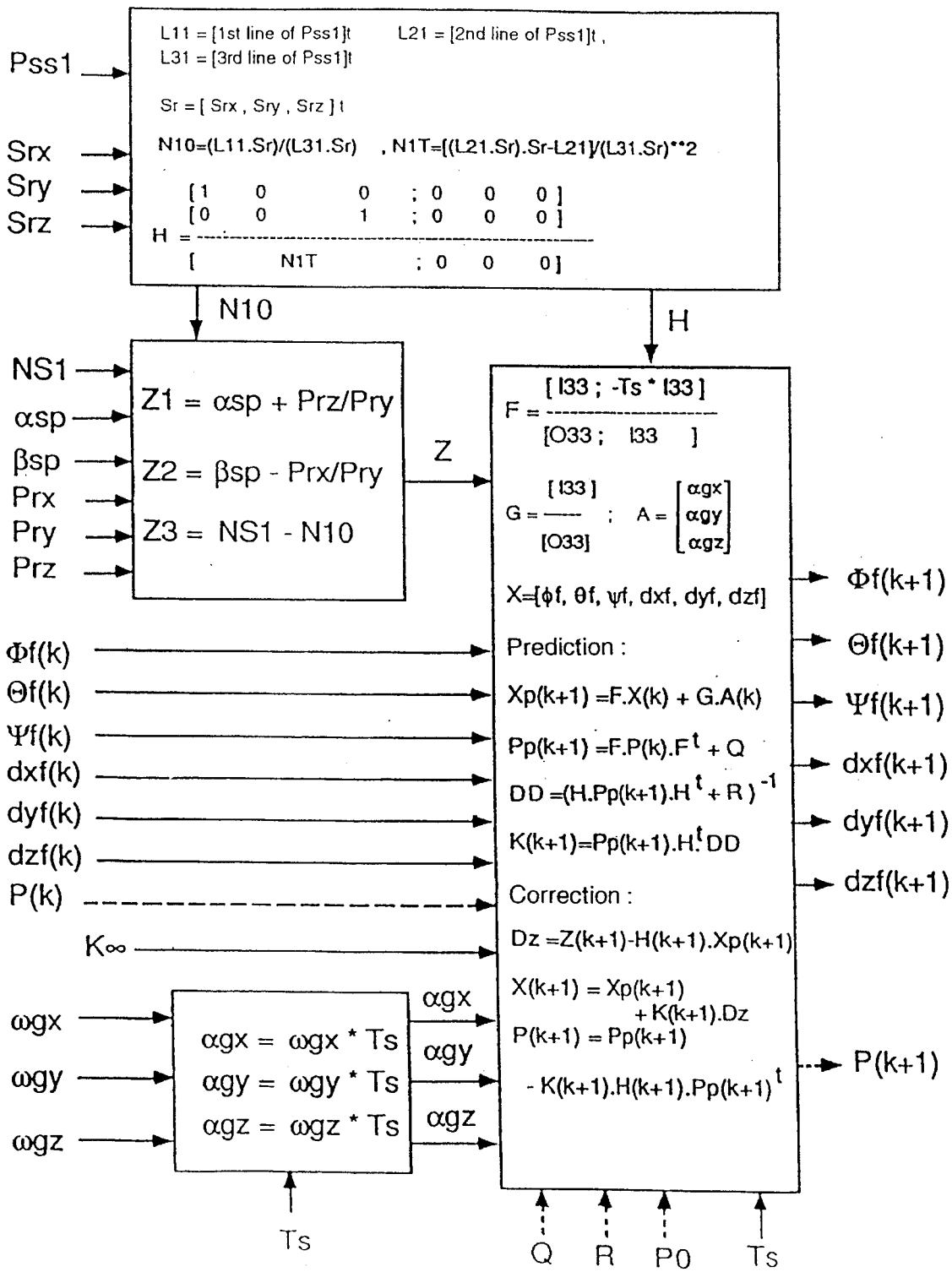

FIG. 8D shows, for example, the detailed structure of the algorithm for estimating attitude and rate gyro drift in transfer orbit using one single-axis solar sensor (SS1) and one Pole Star sensor.

Figure 9A:
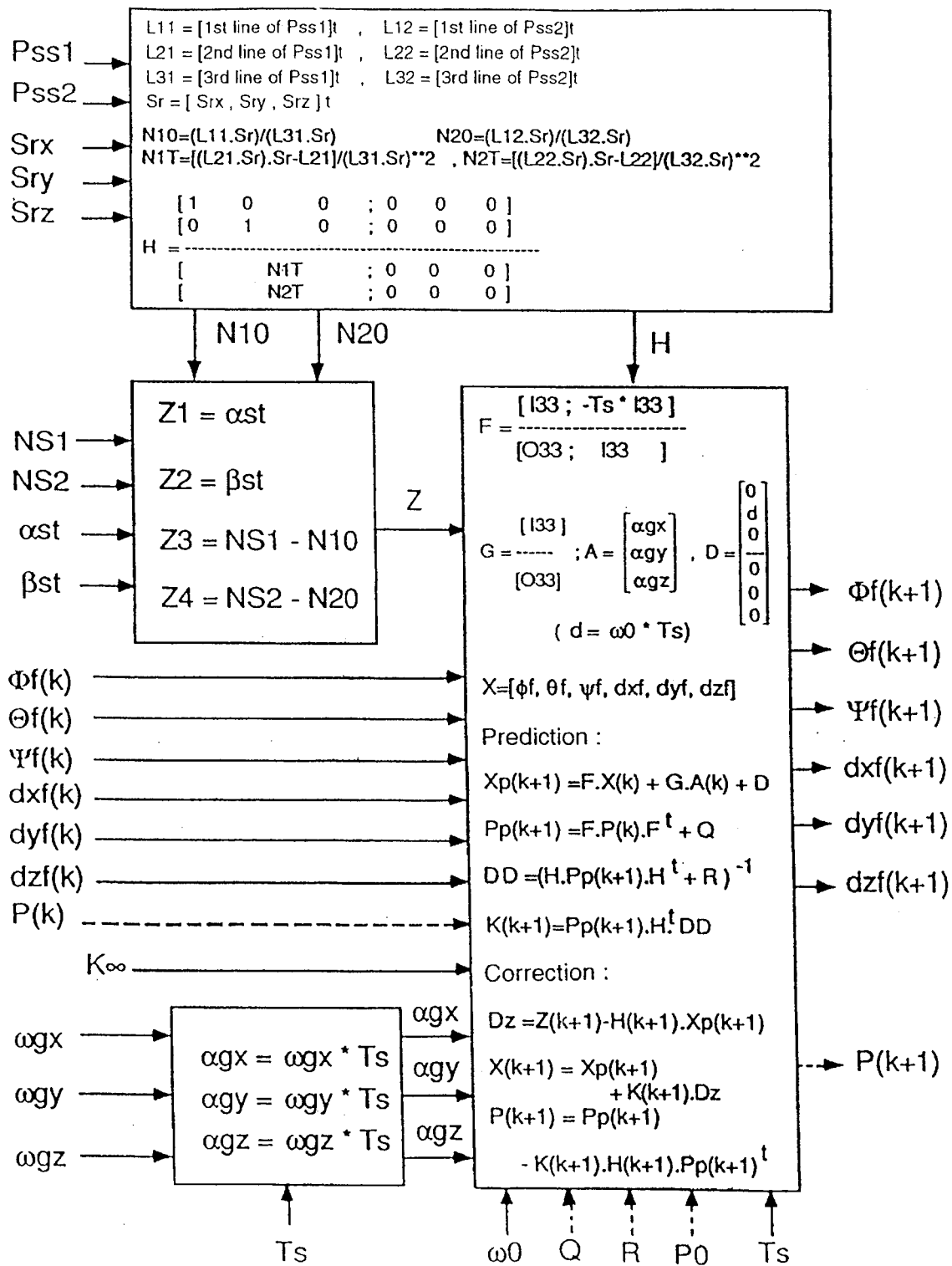
FIGS. 9A through 9D are expanded diagrams of this algorithm for the satellite in an operational orbit, with one or two solar sensors and with one Earth or Pole Star sensor, respectively.

FIG. 9A shows, for example, the detailed structure of the algorithm for estimating attitude and rate gyro drift in normal mode in final orbit using two single-axis solar sensors and one Earth sensor.

Figure 9B:
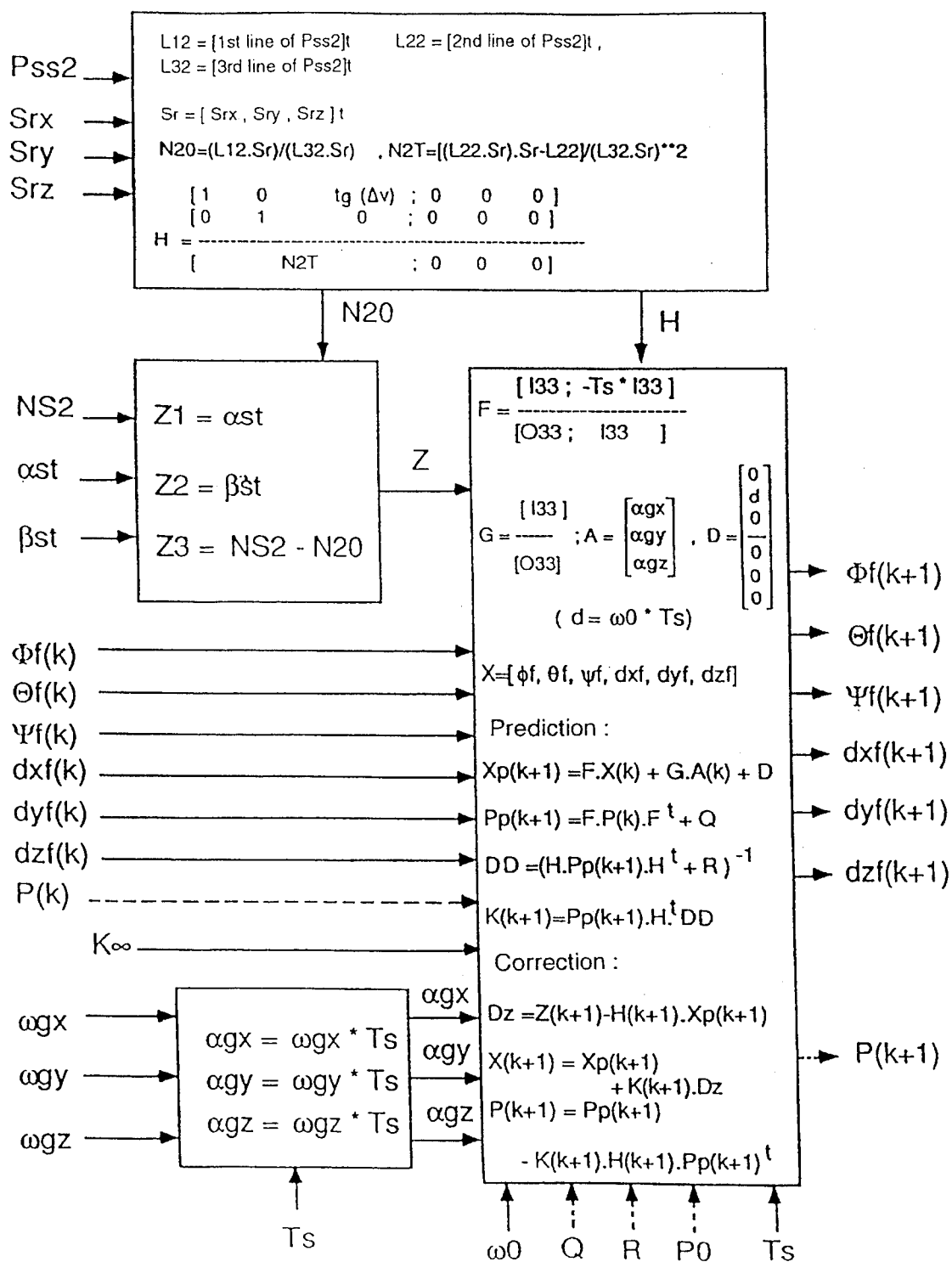

FIG. 9B shows, for example, the detailed structure of the algorithm for estimating attitude and rate gyro drift in normal mode in final orbit using one single-axis solar sensor (SS2) and one Earth sensor.

Figure 9C:
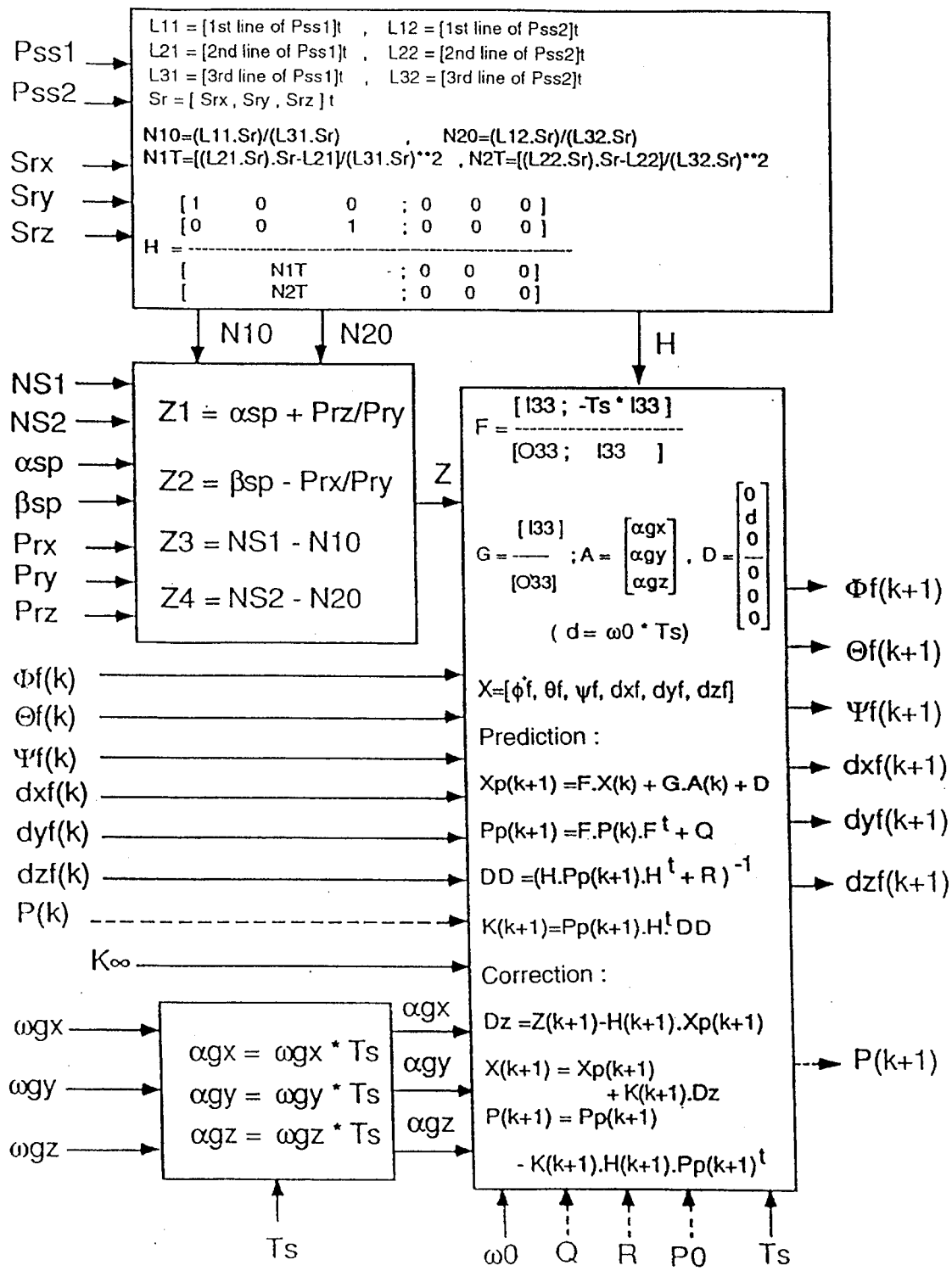

FIG. 9C shows, for example, the detailed structure of the algorithm for estimating attitude and rate gyro drift in normal mode in final orbit using two single-axis solar sensors and one Pole Star sensor.

Figure 9D:
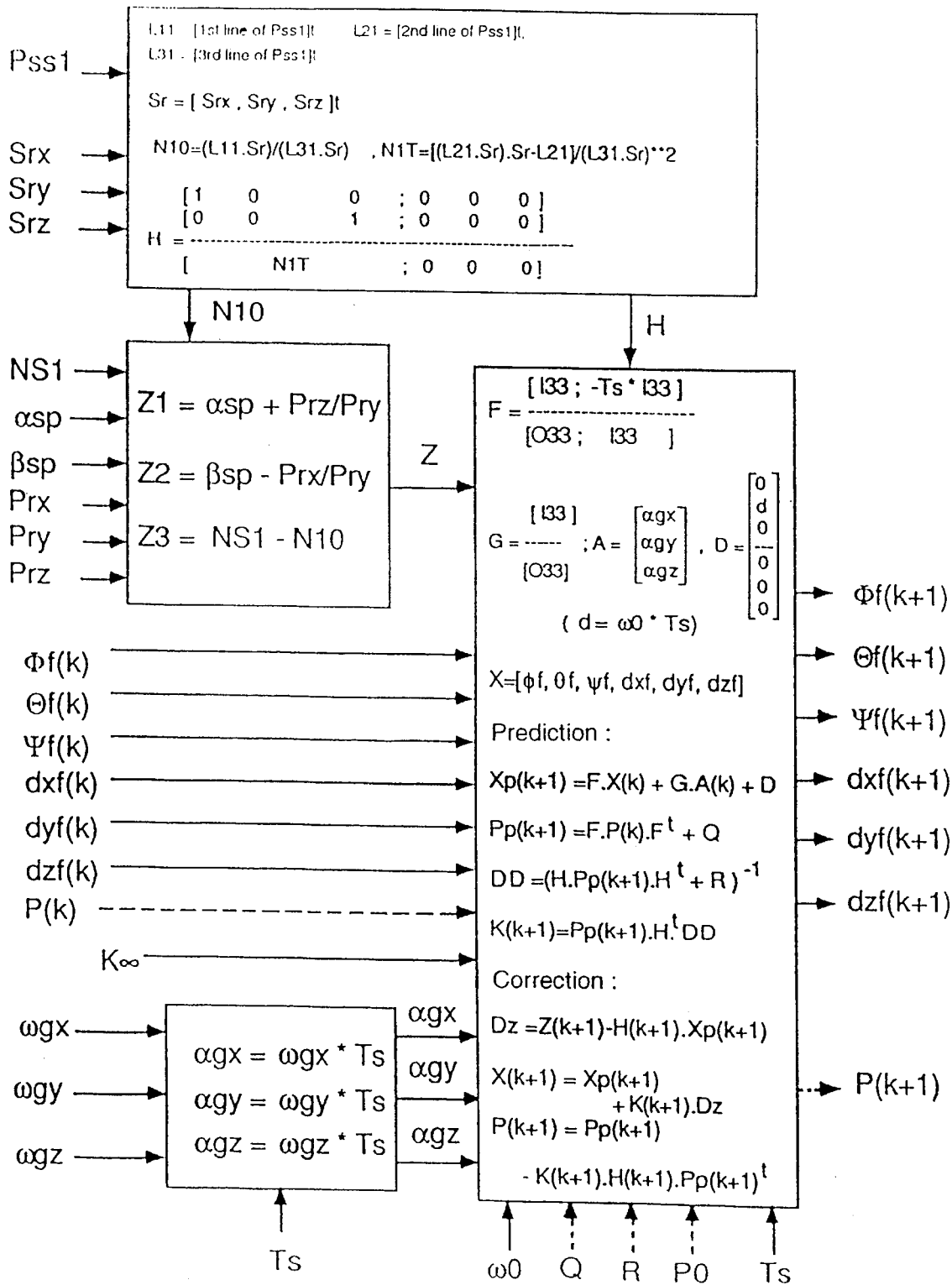

FIG. 9D shows, for example, the detailed structure of the algorithm for estimating attitude and rate gyro drift in normal mode in final orbit using one single-axis solar sensor (SS1) and one Pole Star sensor.

Figure 4:
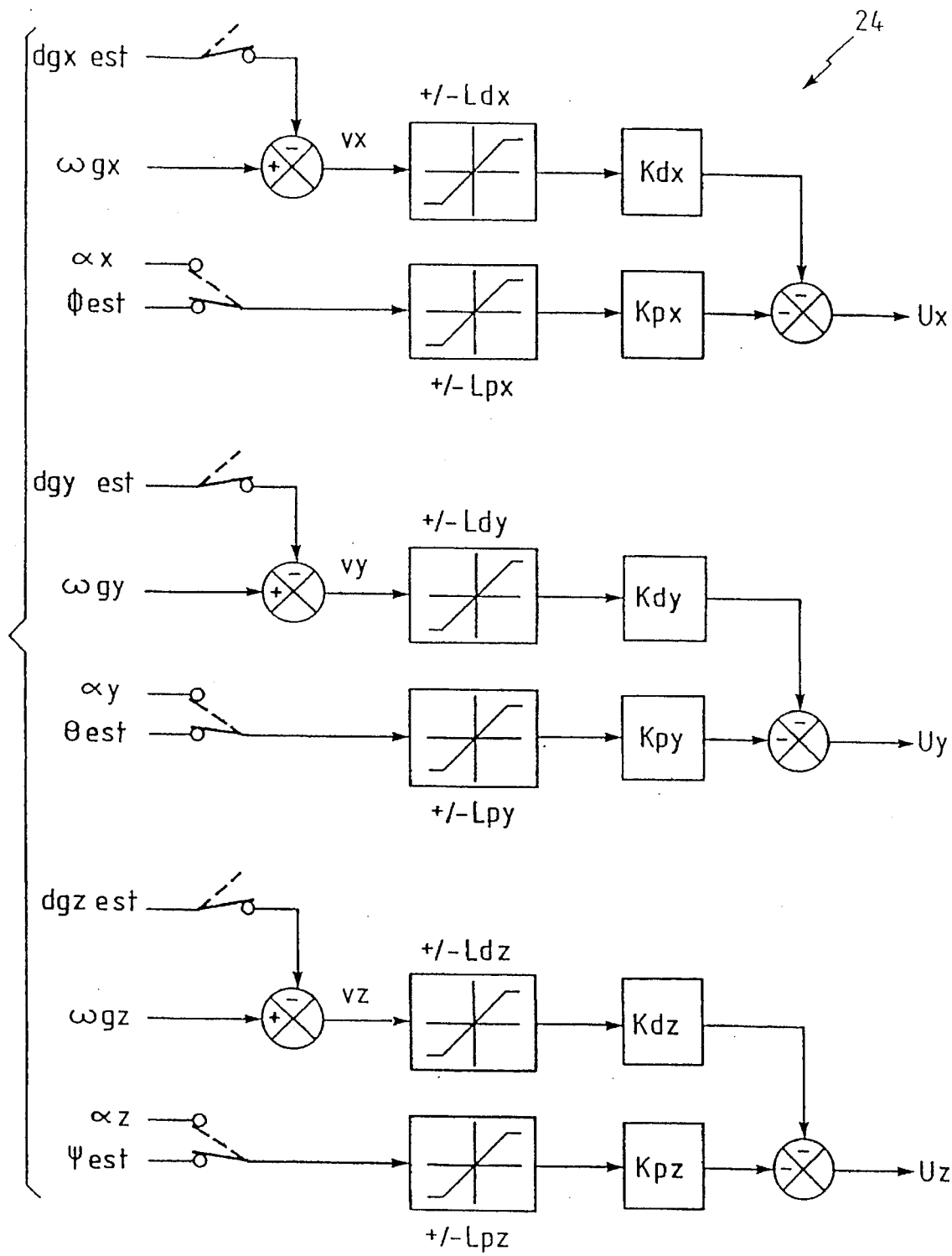
FIG. 4 is a block schematic of the regulator and limiter unit 24 from FIG. 3.
Figure 10:
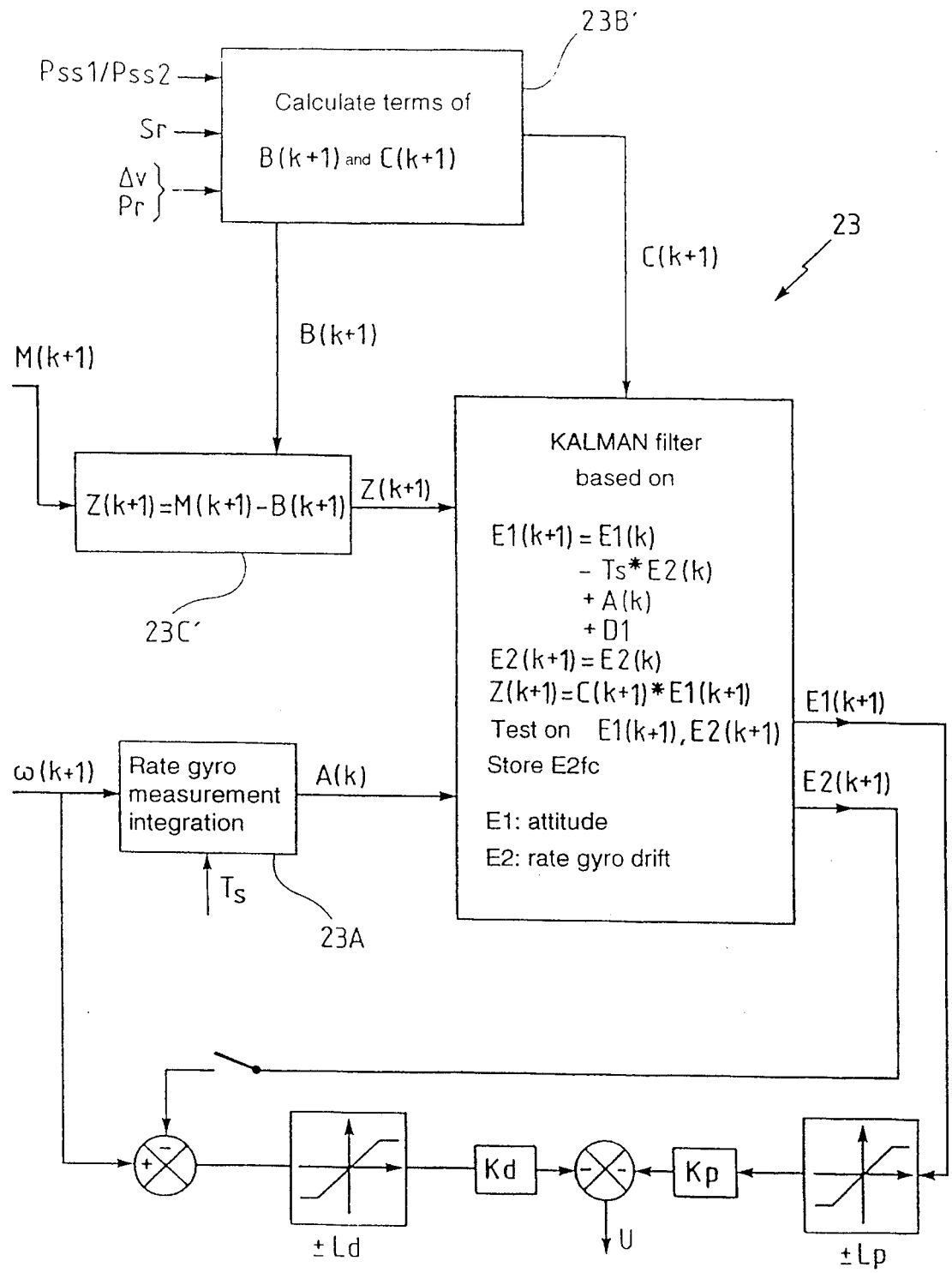
FIG. 10 is a general diagram of the estimation stage from FIG. 7 and the subsequent stage of taking account of estimated values for thruster control.
Figure 11A:
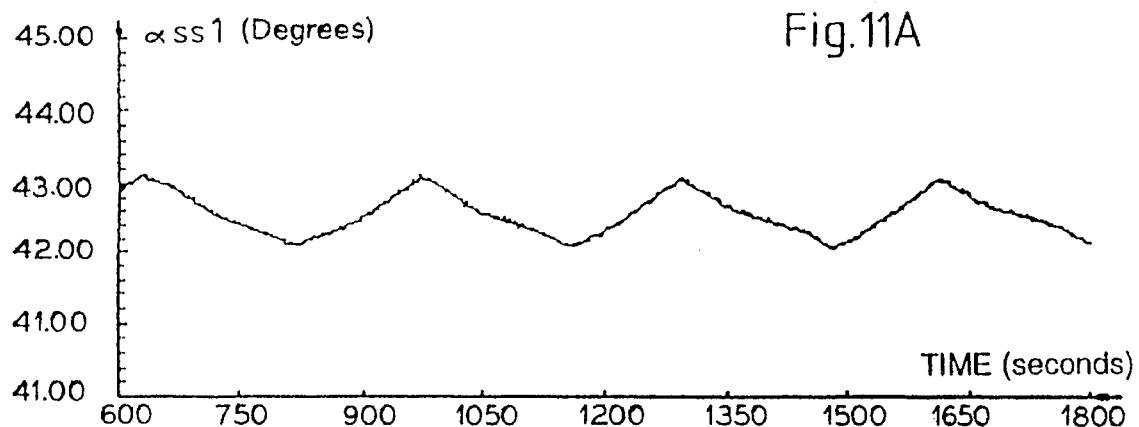
FIGS. 11A through 11C are graphs showing the variation with time of two solar measured values and one roll measured value obtained using a terrestrial sensor.
Figure 11B:
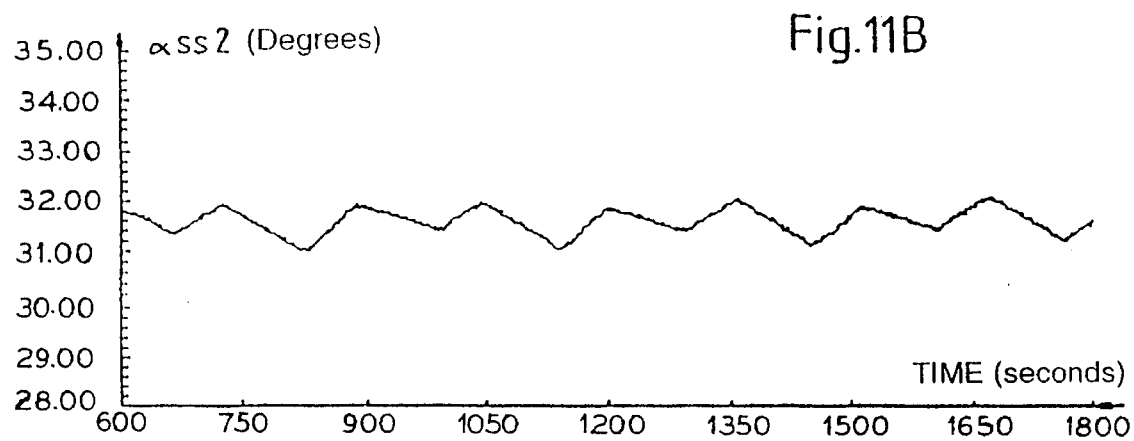
Figure 11C:
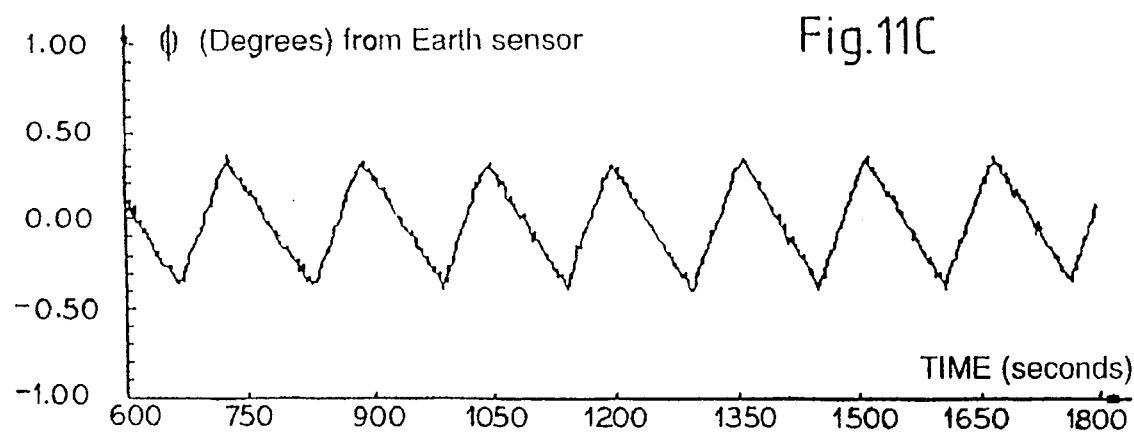
Figure 11D:
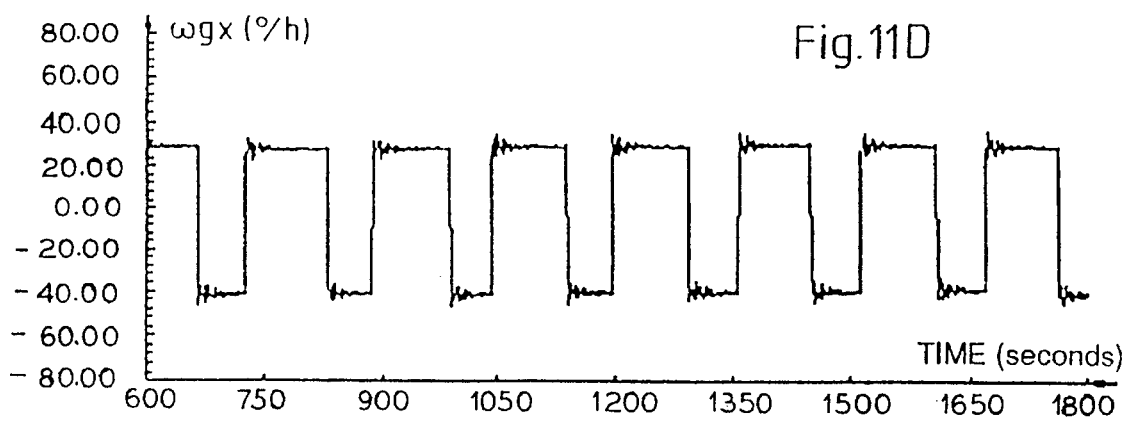
FIGS. 11D through 11F are graphs showing the variation with time of the rate gyro roll, pitch and yaw measured values.
Figure 11E:
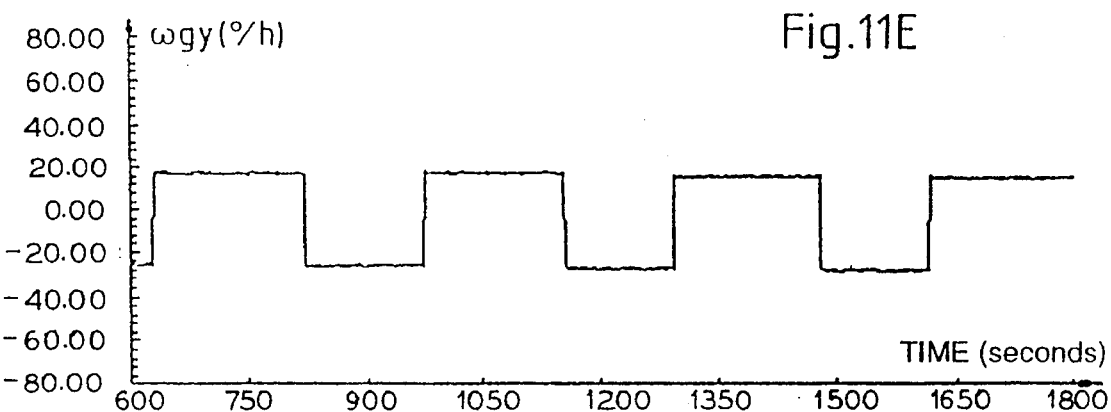
Figure 11F:
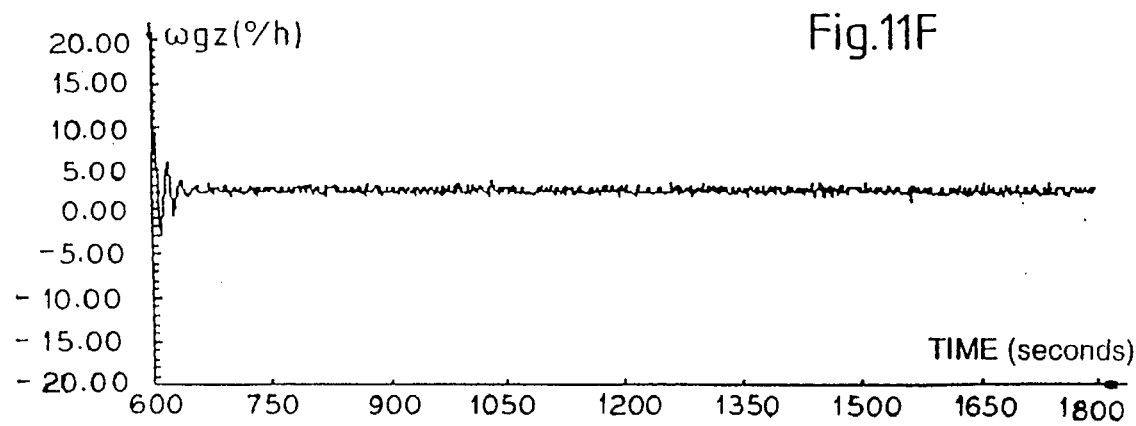
Figure 11G:
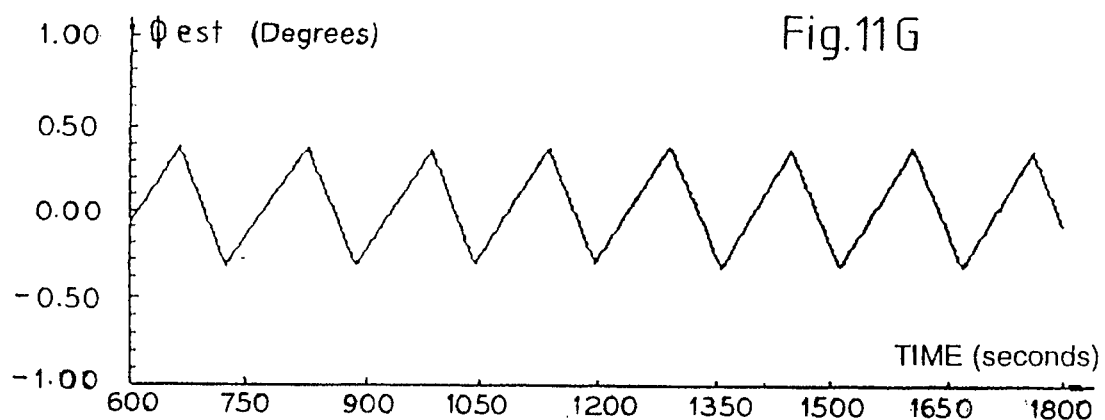
FIGS. 11G through 11I are graphs showing the variation with time of roll, pitch and yaw angles estimated in accordance with the invention.
Figure 11H:
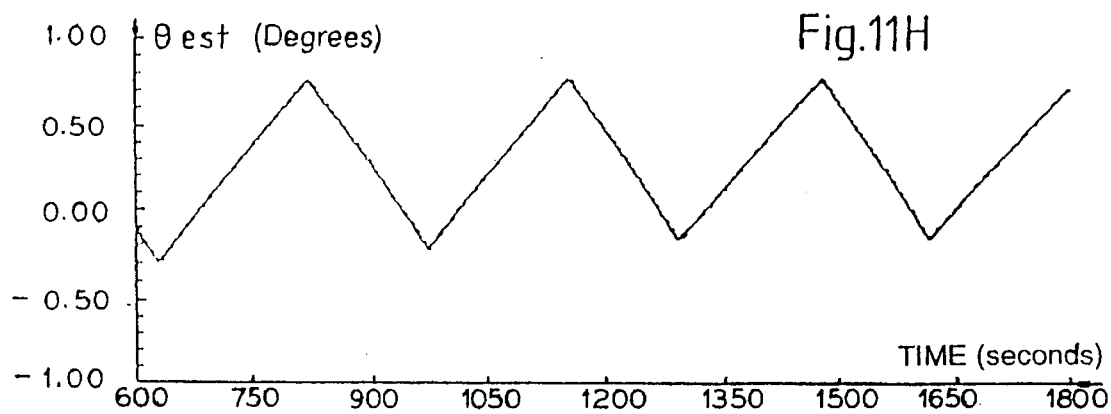
Figure 11I:
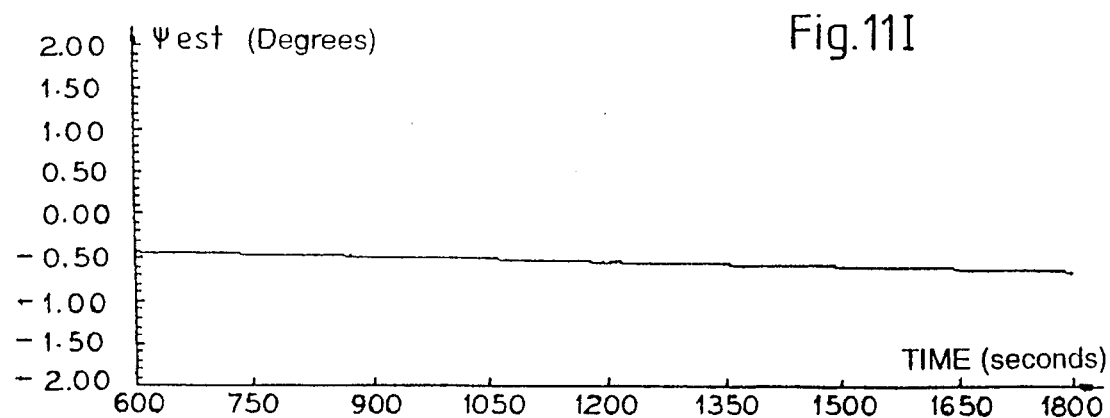
Figure 11J:
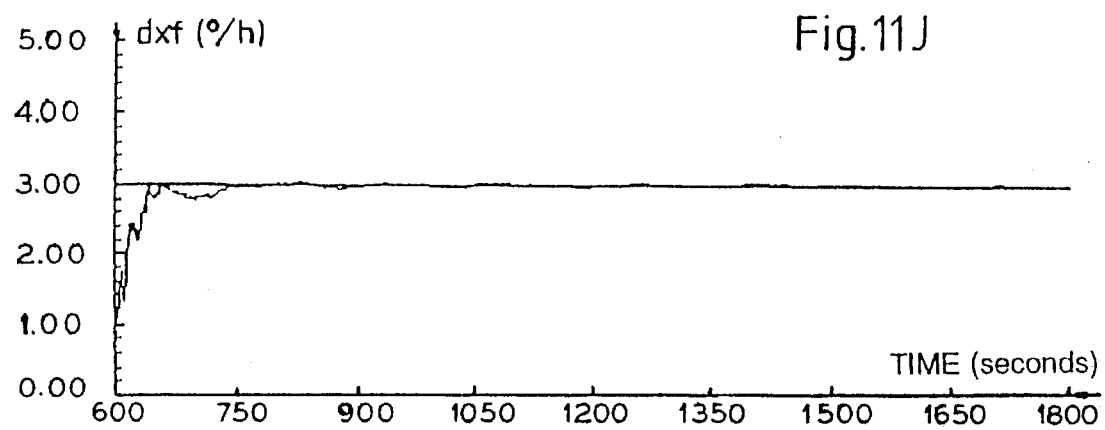
FIGS. 11J through 11L are graphs showing the variation with time of the estimated roll, pitch and yaw derived values.
Figure 11K:
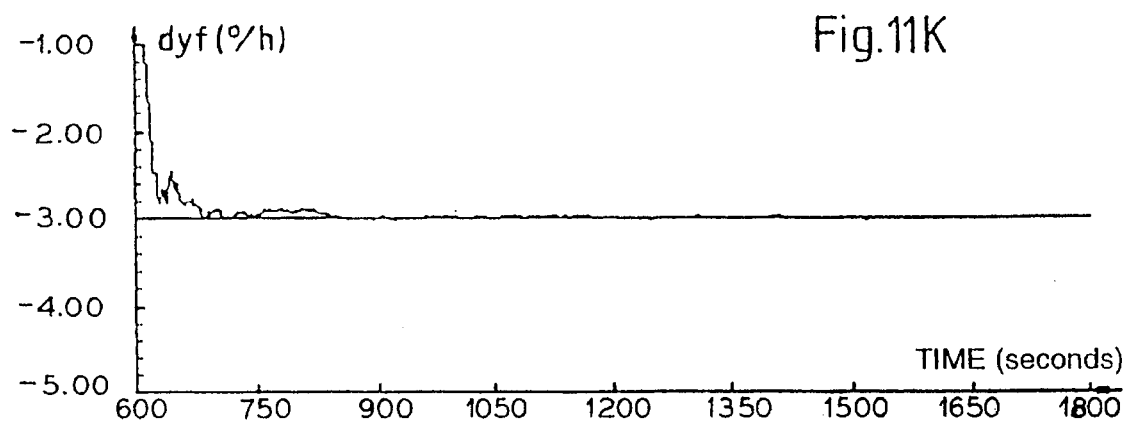
Figure 11L:
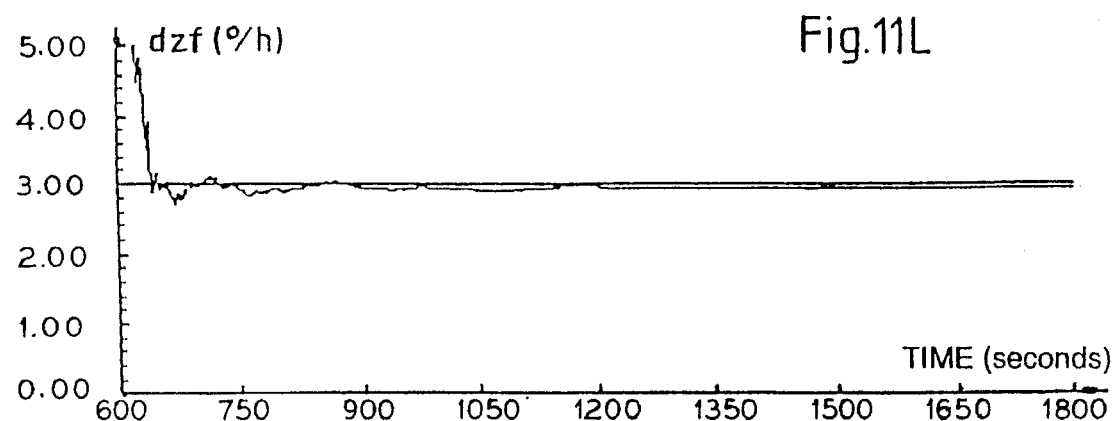
Figure 12A:
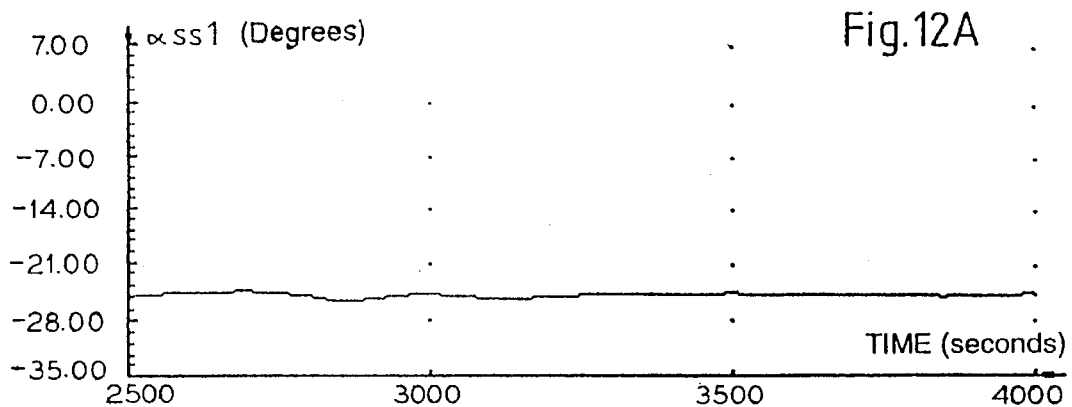
FIGS. 12A through 12L are similar to FIGS. 11A through 11L for the case of two solar measurements and two stellar measurements (roll and yaw).
Figure 12B:
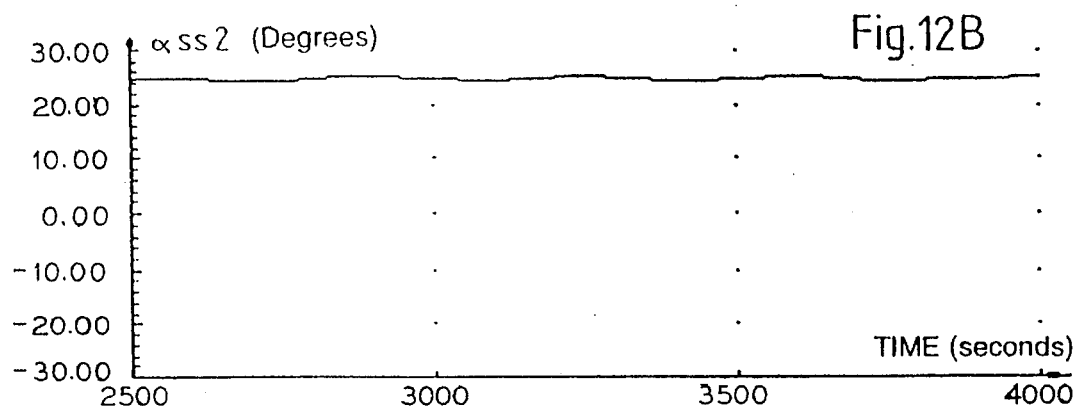
Figure 12C:
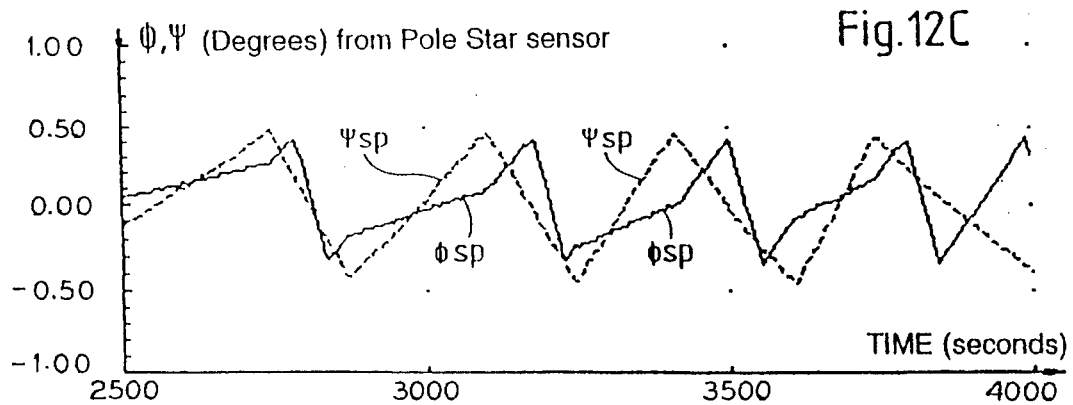
Figure 12D:
Figure 12E:
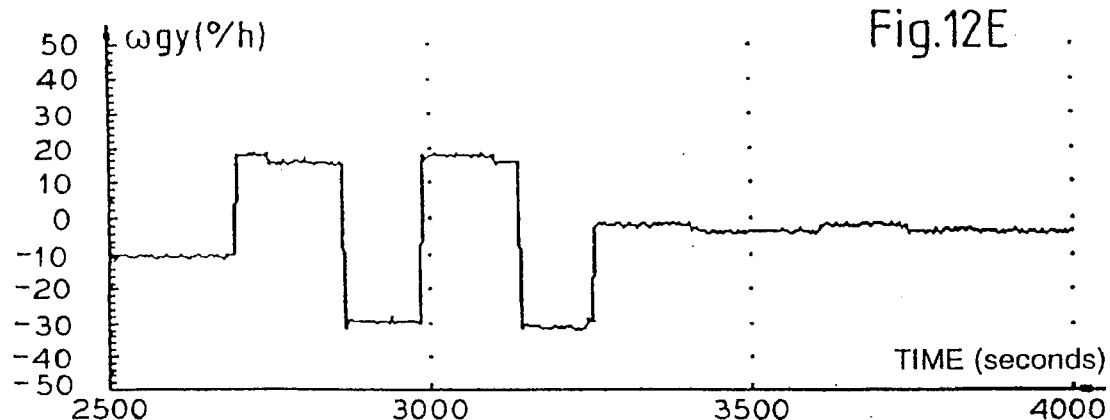
Figure 12F:
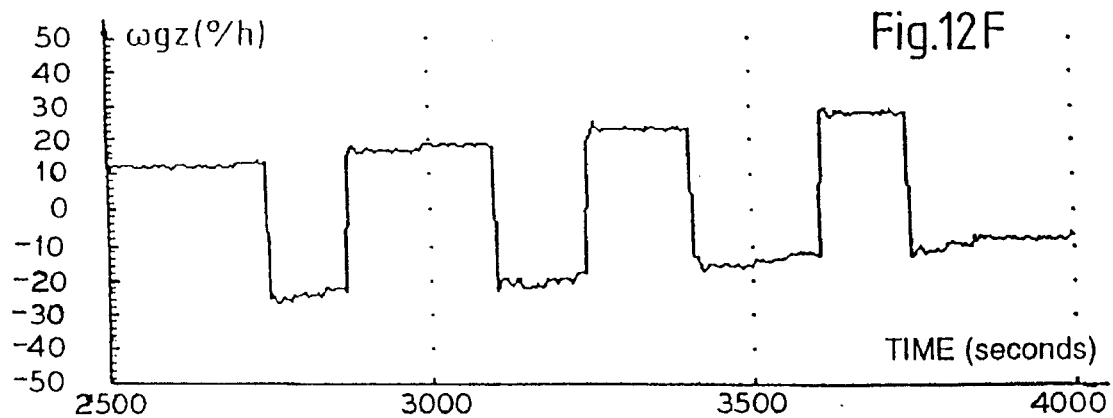
Figure 12G:
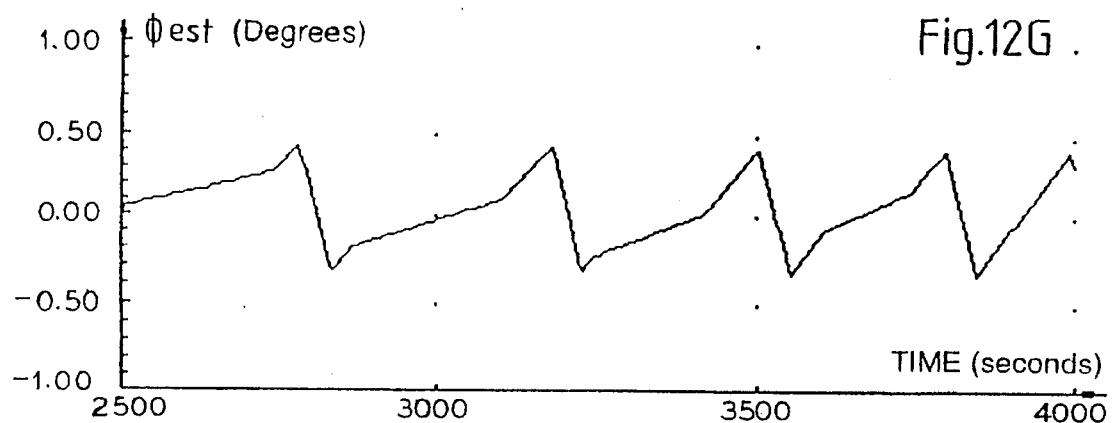
Figure 12H:
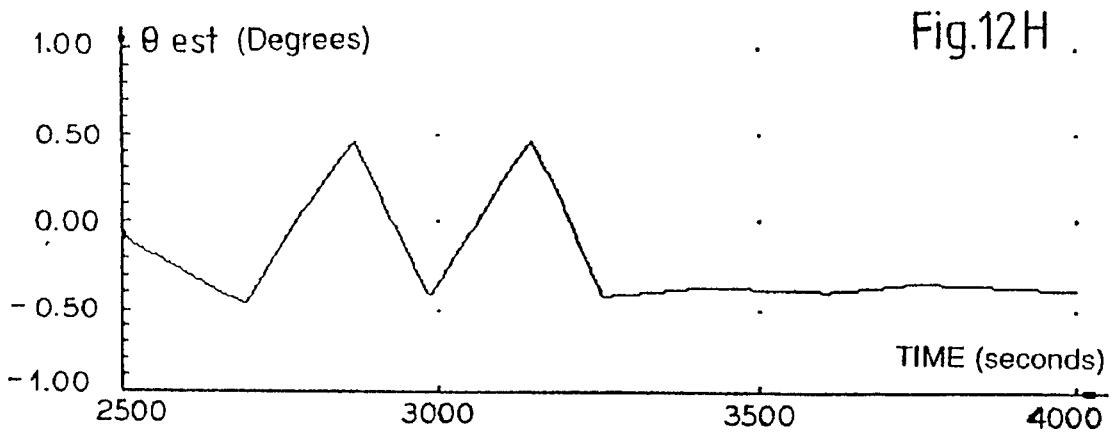
Figure 12I:
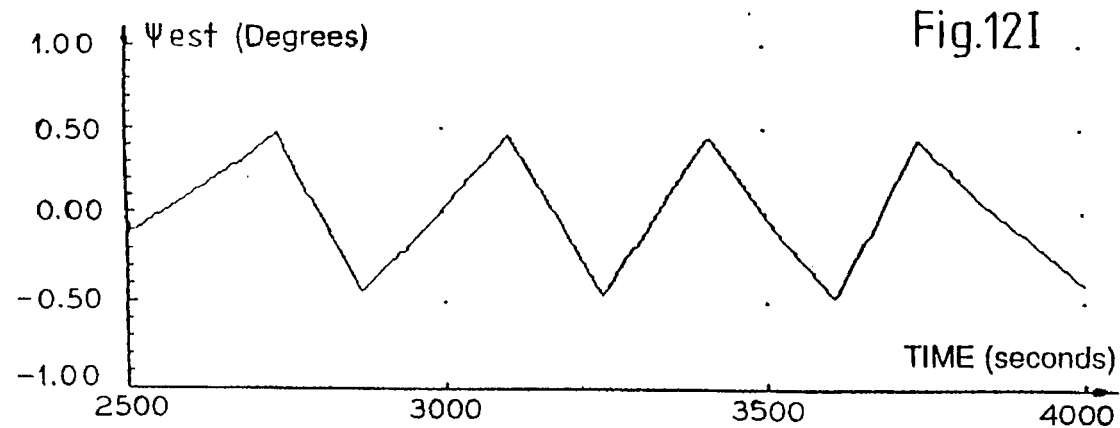
Figure 12J:
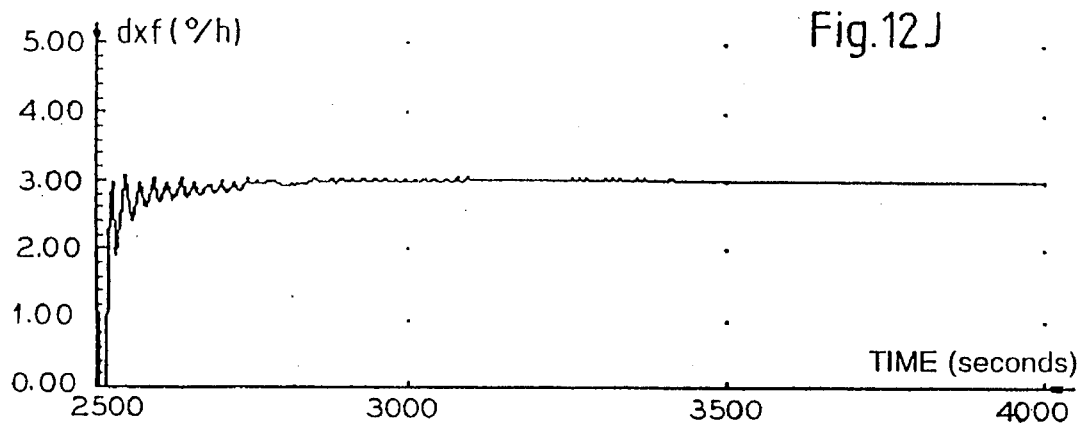
Figure 12K:
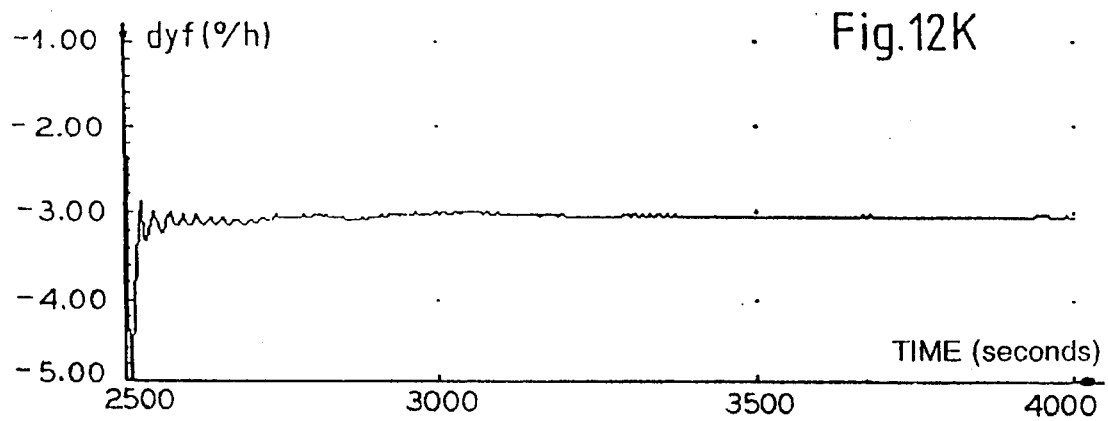
Figure 12L:
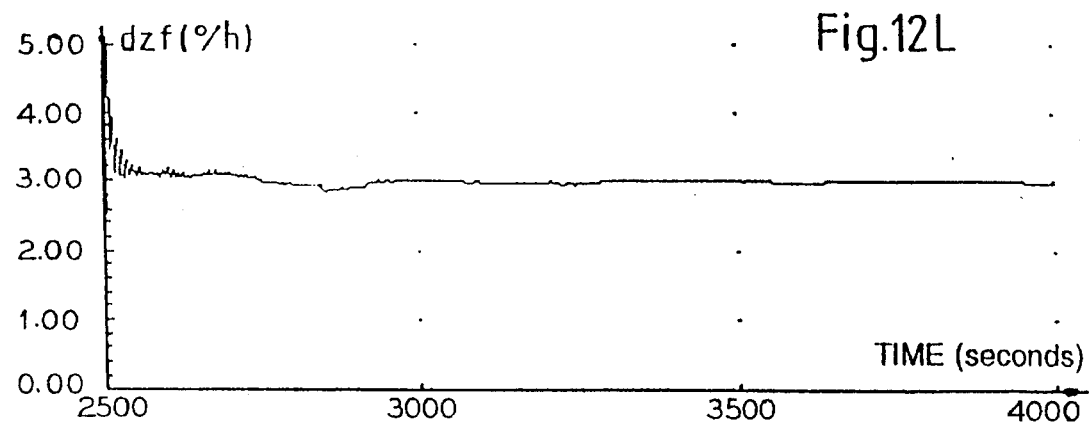

FIG. 10 is a simplified schematic functional diagram, more explicit than that of FIGS. 3 or 7 and additionally showing subsequent use of the estimated magnitudes as defined by FIG. 4.

FIG. 10 shows various synthetic expressions of which FIGS. 8A through 8D and 9A through 9D show specific instances.

M is the column vector formed by the various measurements (3 or 4 depending on whether there is one or two single-axis solar sensors) produced by the logic unit 21 from the various solar, terrestrial and Pole Star sensors and E1 is the column vector formed by the three attitude angles Φ, Θ, and ψ.

The various analyses above with reference to the sensor measurements yield the equation:

$$M=B+C*E1$$

where:

B is the column vector formed by the values assumed by the terms of M when all terms of E1 are null terms, i.e. when the satellite frame of reference is parallel to the reference frame of reference.

C is a 3×3 or 4×3 matrix describing the dependence of M on E1, i.e. describing the relations between the various measurements and the attitude angles.

In the case of FIG. 8, for example, the following equation can be derived from the equations written with reference to the solar and terrestrial sensors:

$$\begin{vmatrix} \alpha st \\ \beta st \\ NS1 \\ NS2 \end{vmatrix} = \begin{vmatrix} 0 \\ \Delta v \\ N10 \\ N20 \end{vmatrix} + \begin{vmatrix} 0 & 1 & 0 & \tan(\Delta v) \\ 0 & 1 & 0 \\ N1x & N1y & N1z \\ N2x & N2y & N2z \end{vmatrix} * \begin{vmatrix} \Phi \\ \Theta \\ \Psi \end{vmatrix}$$

Likewise, in the case of FIG. 8D the following equation can be derived from the equations written with reference to the solar and Pole Star sensors:

$$\begin{vmatrix} \alpha sp \\ \beta sp \\ NS1 \end{vmatrix} = \begin{vmatrix} -Prz/Pry \\ -Prx/Pry \\ N10 \end{vmatrix} + \begin{vmatrix} 1 & 0 & 0 \\ 0 & 0 & 0 \\ N1x & N1y & N1z \end{vmatrix} * \begin{vmatrix} \Phi \\ \Theta \\ \Psi \end{vmatrix}$$

B and C can be predetermined (i.e. determined by given equations) from matrices defining the location of the sensors on the satellite and the instantaneous values of Srx, Sry, Srz, Prx, Pry, Prz (i.e. the instantaneous position in the selected frame of reference of the unit Sun vector (vector Sr), and of the unit Pole Star vector (vector Pr) (in the case of the Pole Star sensor), and of Δv (in the case of a terrestrial sensor).

The matrix H is readily deduced from C by adding to the right of C three null term columns, i.e.:

$$H=|C:0|$$

In FIG. 10, the calculation as a function of Srx, Sry, Srz and Prx, Pry, Prz (Pole Star sensor) or Δv (Earth sensor) is effected by a unit 23B' which differs from the unit 23B in FIG. 7 in that it also calculates the terms of B which are dependent on Δv or on Prx, Pry and Prz and which, in FIG. 7, are calculated by unit 23C.

The measurement vector Z is then readily deduced from vector M by Z=M=B (it is therefore the part of M which varies directly with attitude). This calculation is performed by a unit 23C' (FIG. 10) which differs from the unit 23C in FIG. 7 in that does not have to allow for Δv or Pr as these magnitudes have been processed by the unit 23B'

It will be understood that it amounts to the same thing to write:

$Z=C*E1$ or $Z=H*X$

A is the column vector formed from the three rotation increments supplied by the rate gyro measurement integration unit 23A and E2 is the column vector formed by the rate gyro drifts (A(k) and E2(k) being the values of these vectors at time t=k*Ts).

Using discrete notation, the values of these vectors at times k and (k+1) are related as follows:

$E1(k+1)=E1(k)-Ts*E2(k)+A(k)+D1$ $E2(k+1)=E2(k)$

D1 being formed by the angles of a possible change of orientation of the reference frame of reference in which E1 and E2 are measured and the second equation reflecting the fact that the rate gyro drifts of E2 are assumed to be constant on average with time.

Allowing for the fact that X is a vector formed by superimposing vectors E1 and E2 and where D is the column vector formed by three terms of D1 and then three zeros, it is possible to write:

$X(k+1)=F*X(k)+G*A(k)+D$ $Z(k)=H*X(k)$ where F, G and H are the predetermined formulations indicated in FIGS. 8A, ..., 8D, 9A, ..., 9D. Apart from noise, these are the equations for the Kalman filter. It should be remembered that the Kalman filter first performs a prediction in accordance with the first equation and then corrects the predicted value of X by a term (in fact a matrix) which is the product of the difference between the two terms of the second equation and a gain matrix.

The terms of the vectors E1 and E2 and the vector co representing angular speeds measured by the rate gyros are then applied, as shown in FIG. 4, to three parallel limiter/regulation stages (shown conjointly in FIG. 10) to give the vector U formed of the components to be applied by the thrusters.

If the rate gyros are of the integrating type, the terms in ω are not available but the terms of the vector A can then be measured directly. The right-hand part of the FIG. 10 diagram is then modified by multiplying the terms of E2(k+1) by Ts and adding them to A rather than ω.

These estimated values are subject to a convergence test and when the values of the estimated terms of E2 become constant (to within a predetermined tolerance) and the terms of the estimated satellite attitude, i.e. E1, have also become constant (to within a different predetermined tolerance) these values of E2 (these end of calibration values are denoted E2fc in FIG. 10) are stored in order to use them later to control attitude using the rate gyros during a subsequent mode (apogee thrust or station-keeping) during which the control logic can receive only the difference between the rate gyro instantaneous measurements and their constant drifts E2fc as estimated previously, during calibration.

This completes the calibration phase. In practice it takes 10 minutes to 30 minutes if the closest tolerance for E1 is 0.1°/h and if the closest tolerance for E2 is 0.5°.

Two examples are given to illustrate the relative performance of the invention:

FIGS. 11A through 11L show the result of simulation in a typical case of calibration of rate gyro drift with two solar sensors and one Earth sensor. The constant bias of the X, Y and Z rate gyros are chosen equal to +3°/h, −3°/h and +3° /h, respectively (typical values for rate gyros as used on three-axis telecommunication satellites). The calibration phase starts at t=600 s and the rate gyro drifts are estimated to within 0.1°/h towards t+1,200 s (i.e. after ten minutes) and at the same time the attitude of the satellite is estimated with good accuracy and maintained to within 0.5° with respect to all three axes.

FIGS. 12A through 12L show the simulation results for rate gyro drift calibration using two solar sensors and one Pole Star sensor. The constant bias values to be estimated are identical to those of the preceding example and the calibration phase starts at t=2,500 s. The performance of the drift estimation and attitude angle control are comparable to the previous example.

These simulations were carried out under the following conditions:

simulation with Earth sensor—FIGS. 11A through 11L:

. $Ts = 500$ ms $$Q = \begin{vmatrix} I33 & 033 \\ 033 & 033 \end{vmatrix} * 1.37 \cdot 10^{-12}$$

$$Q = \begin{vmatrix} R1 & 022 \\ 022 & R2 \end{vmatrix}$$

where $R1 = I22 * 8.46 \cdot 10^{-8}$
$R2 = I22 * 7.32 \cdot 10^{-8}$ $$P(0) = \begin{vmatrix} P1 & P2 \\ P2 & P3 \end{vmatrix}$$

where:

$$P1 = \begin{vmatrix} 3 & 3.7 & -7.7 \\ 3.7 & 11.4 & -19 \\ -7.7 & -19 & 38.5 \end{vmatrix} * 10^{-6}$$

$$P2 = \begin{vmatrix} -1.122 & -1.389 & 2.878 \\ -1.388 & -4.261 & 7.087 \\ 2.877 & 7.087 & -14.700 \end{vmatrix} * 10^{-8}$$

$$P3 = \begin{vmatrix} 6.09 & 6.835 & -14.17 \\ 6.835 & 21.72 & -35.15 \\ -14.170 & -35.15 & 71.80 \end{vmatrix} * 10^{-11}$$

. $x(0) = [0\ 0\ 0\ 0\ 0\ 0]^t$
simulation with Pole Star sensor - FIGS. 12A to12L:
. $Ts = 200$ ms
. same $Q$ $$R = \begin{vmatrix} R1 & 022 \\ 022 & R2 \end{vmatrix}$$

where $R1 = I22 * 8.46 \cdot 10^{-8}$
$R2 = I22 * 5.97 \cdot 10^{-10}$
. same $P(0)$
. same $X(0)$ It is obvious that the foregoing description has been given by way of non-limiting example only and that numerous variants can be put forward by one skilled in the art without departing from the scope of the invention. For example, as previously mentioned, there can be one or two solar measurements, and additionally it is possible to use only one Earth or Pole Star sensor measurement. Further, the teaching of the invention can be generalized to any other recursive filter method (of the least squares or Luenberger type, for example). If a Pole Star sensor is used, the satellite orbit is preferably one with an inclination of not more than 10° to the terrestrial equatorial plane; if a terrestrial sensor is used a much greater inclination is feasible.

We claim:

1. A method of calibrating a set of rate gyros on a three-axis stabilized satellite in an orbit having a motion direction about the Earth, said method comprising the steps of:

selecting an attitude reference frame of reference;

selecting a satellite reference frame of reference;

selecting an attitude sensing system comprising said set of rate gyros to be mounted to said satellite for supplying attitude measurement signals of said satellite and speed measurements of said set of rate gyros with respect to said satellite reference frame of reference;

selecting a set of actuators to be connected to said satellite for controlling the orientation of said satellite reference frame of reference with respect to said attitude reference frame of reference;

selecting control logic for deriving a set of control signals from input signals and for applying said set of control signals to said set of actuators;

estimating a set of attitude error values representing the attitude difference between an instant orientation of said satellite and said attitude reference frame of reference;

estimating a set of constant drift values representing a constant drift for each of said set of rate gyros about said satellite reference frame of reference;

calculating a difference between said speed measurements and said constant drift value;

using as input signals to said control logic, in real time, said set of estimated attitude error values and said difference; and storing said set of estimated constant drift values when they are within a predetermined first tolerance and when said set of estimated attitude error values are within a predetermined second tolerance.

2. A method according to claim 1 wherein said first tolerance is approximately 0.1°/h and said second tolerance is approximately 0.5°.

3. A method according to claim 1 wherein said set of attitude error values and said set of constant drift values are estimated by means of a KALMAN filter defined by the following equations, using discrete notation:

$$Xp(k+1)=F*X(k)+G*A(k)+D$$

$$X(k+1)=Xp(k+1)+K(k+1)*[Z(k+1)-H(k+1)*Xp(k+1)]$$

where:

k is a sampling index associated with time t such that $t-to=k*Ts$ where Ts is the sampling increment, X(k) is a column vector formed of three attitude values and three drift values at time k, relative to said reference frame of reference, A(k) is a column vector formed of three rotation increments at time k of said satellite relative to said reference frame of reference from time (k−1), Z(k+1) is a measurement column vector formed of a plurality of n error signals each defined at time (k+1) by the difference between a measurement signal supplied by said attitude sensing system and a set point signal, Xp(k+1) is a six-term column vector predicted by the first equation for time (k+1), X(k+1) is a six-term column vector estimated at time (k+1) using the second equation from Xp(k+1) and Z(k+1), K(k+1) is a gain matrix with six rows and n columns, F and G are constant term state matrices respectively having six rows and six columns and six rows and three columns describing the respective theoretical influences of x(k) and A(k) on X(k+1), D is a column vector formed of three terms describing the attitude of said reference frame of reference at time (k+1) relative to said reference frame of reference at time k and three null terms, and H(k+1) is an observation matrix with x rows and six columns of which the terms at time (k+1) are predetermined, this matrix describing the theoretical relations at any time (k+1) between Z(k+1) and X(k+1).

4. A method according to claim 3 further comprising the step of further defining said first equation as follows:

$$E1(k+1)=E1(k)=Ts*E2(k)+A(k)+D1$$

$$E2(k+1)=E2(k)$$

where:

E1(k) and E1(k+1) are formed of three attitude values of X(k) and X(k+1),

E2(k) and E2(k+1) are formed of three drift values of X(k) and X(k+1),

D1 is formed of the first three terms of D and the matrix H is written:

$$H(k+1)=|C(k+1)\ 0n3|$$

where:

0n3 is a null matrix with n rows and three columns,

C(k+1) is a matrix with n rows and three columns such that the following theoretical equation can be written:

$$Z(k+1)=C(k+1)*E1(k+1).$$

5. A method according to claim 3 further comprising the step of further defining Z(k+1) as being formed of at least two terms deduced from two measurements of an Earth sensor or a star sensor and at least one term deduced from a measurement by a single-axis solar sensor.

6. A method according to claim 1 further comprising the step of selecting said attitude reference frame of reference as being fixed in space.

7. A method according to claim 1 further comprising the step of characterizing said orbit of said satellite as being a transfer orbit.

8. A method according to claim 1 wherein said step of selecting said attitude sensing system further comprises:

providing at least one single-axis solar sensor;

providing one Earth sensor; and selecting said attitude reference frame of reference as being a direct frame of reference (Xr, Yr, Zr), wherein Yr is normal to a plane of said orbit, Zr points towards the Earth, and Xr is in a direction equal to said motion direction of said satellite.

9. A method according to claim 1 wherein said step of selecting said attitude sensing system further comprises:

providing at least one single-axis solar sensor;

providing one star sensor pointing at the Pole Star; and selecting said orbit of said satellite with an inclination of not more than approximately 10°; and selecting said attitude reference frame of reference as a direct frame of reference (Xr, Yr, Zr) wherein Yr points towards a geographical South direction and Zr is normal to a solar direction.

10. A method according to claim 1 further comprising the step of selecting said attitude reference frame of reference as being a direct frame of reference Xr, Yr, Zr, wherein Yr is instantaneously perpendicular to the orbital plane, Zr is instantaneously pointed towards the Earth and Xr is instantaneously in a direction equal to said direction of said satellite.

11. A method according to claim 10 further comprising the step of selecting said orbit as being circular.

12. A method according to claim 10 wherein said step of selecting said attitude sensing system includes selecting at least one single-axis solar sensor and one two-axis terrestrial sensor.

13. A method according to claim 10 further comprising the steps of:

selecting said orbit as having an inclination of not more than approximately 10°; and selecting said attitude sensing system including at least one single axis-solar sensor and one two-axis solar sensor adapted to point towards to the Pole Star.

14. An attitude control device for a three-axis stabilized satellite in an orbit having a motion direction about the Earth, said attitude control device comprising:

a link having an input and an output;

attitude sensing means having an output connected to said input of said link for detecting an attitude of said satellite;

a plurality of actuators each of said plurality of actuators having an input;

a plurality of rate gyros in said attitude sensing means, each of said plurality of rate gyros having an output;

control logic means having a first and second input, and a plurality of outputs each connected to a respective input of each of said plurality of actuators;

a predetermined reference frame of reference;

estimator means having a first input connected to said attitude sensing means for receiving a set of instantaneous values representing said attitude of said satellite relative to said reference frame of reference; a second input connected to each of said plurality of rate gyros for receiving instantaneous measurements from said plurality of rate gyros; a first output supplying a set of estimated values representing an estimation of a constant drift of said plurality of rate gyros; and a second output supplying a set of estimated values representing an estimation of said attitude of said satellite; and switching means having a first input connected to said first output of said estimator means; a second input connected to said second output of said estimator means; a third input connected to said output of said link; and a first and second output respectively connected to said first and second inputs of said control logic, whereby said switching means provides first and second output signals from either said link or from said estimator means, such that the effect of drift of said plurality of rate gyros is minimized.

15. The device according to claim 14 wherein said attitude sensing means comprises at least one single-axis solar sensor and one two-axis terrestrial sensor.

16. The device according to claim 14 wherein said attitude sensing means comprises at least one single-axis solar sensor and one two-axis star sensor adapted to be pointed towards the Pole Star.

17. The device according to claim 14 wherein said control logic includes a set of linear regulators and limiters, a set of filters, and a set of nonlinear modulators.

18. The device according to claim 17 wherein said set of linear regulators and limiters are of a proportional-derivative type.

19. The device according to claim 17 wherein said set of linear regulators and limiters are of a proportional-integral-derivative type.

20. The device according to claim 17 wherein said set of filters are second order digital filters.

21. The device according to claim 17 wherein said set of nonlinear modulators are pseudo-rate modulators (PRM).

22. The device according to claim 17 wherein said set of nonlinear modulators are pulse width pulse frequency (PWPF) modulators.

* * * * *

UNITED STATES PATENT AND TRADEMARK OFFICE
CERTIFICATE OF CORRECTION

PATENT NO. : 5,562,266  
DATED : October 8, 1996  
INVENTOR(S) : Achkar et al

Page 1 of 3

It is certified that error appears in the above-indentified patent and that said Letters Patent is hereby corrected as shown below:

Column 4, line 42, delete "$H(k+1)=|C(k+1):0n3|$" insert ---- $H(k+1)=|C(k+1):0n3|$ ----.

Column 7, line 14, delete "axis)," insert ---- axis); ----.

Column 9, line 12, delete "ßst and ßst" insert ---- $\alpha$st and ßs ----.

Column 9, line 34, delete "ß$\rho$ and ßs$\rho$" insert ---- $\alpha$s$\rho$ and ßs$\rho$ ----.

Column 9, line 64, delete "pan" insert ---- part ----.

Column 10, line 2, delete "is".

Column 12, line 49, delete "gryo" insert ---- gyro ----.

UNITED STATES PATENT AND TRADEMARK OFFICE
CERTIFICATE OF CORRECTION

Page 2 of 3

PATENT NO. : 5,562,266
DATED : October 8, 1996
INVENTOR(S) : Achkar et al

It is certiffed that error appears in the above-indentified patent and that said Letters Patent is hereby corrected as shown below:

Column 13, line 20, delete "flitrage" insert ---- filtrage ----.

Column 13, line 58, delete "$\alpha sp(k),$" insert ---- $\alpha sp(k)$ ----.

Column 15, line 36, delete "of" insert ---- or ----.

Column 15, line 47, delete "gryo" insert ---- gyro ----.

Column 16, line 54, delete "$H=|C:0|$" insert ---- $H=|C\dot{:}0|$ ----.

Column 16, line 63, delete "Z=M=B" insert ---- Z=M-B ----.

Column 16, line 67, after "23B'" insert ---- . ----.

Column 17, line 38, delete "co" insert ---- $\Omega$ ----.

UNITED STATES PATENT AND TRADEMARK OFFICE
CERTIFICATE OF CORRECTION

PATENT NO. : 5,562,266
DATED : October 8, 1996
INVENTOR(S) : Achkar et al

It is certified that error appears in the above-indentified patent and that said Letters Patent is hereby corrected as shown below:

Column 21, line 19, delete "single axis-solar" insert ---- single-axis solar ----.

Column 21, line 29, after "actuators" first occurrence, insert ---- , ----.

Column 22, line 23, delete "star" insert ---- solar ----.

Signed and Sealed this

Twenty-sixth Day of August, 1997

Attest:

BRUCE LEHMAN

Attesting Officer

Commissioner of Patents and Trademarks